US011991532B2

(12) United States Patent
Laghate et al.

(10) Patent No.: US 11,991,532 B2
(45) Date of Patent: May 21, 2024

(54) TECHNIQUES FOR MODIFYING VALUES TRANSMITTED IN A MEASUREMENT REPORT FOR BEAM MANAGEMENT

(71) Applicant: QUALCOMM Incorporated, San Diego, CA (US)

(72) Inventors: Mihir Vijay Laghate, San Diego, CA (US); Yongle Wu, San Diego, CA (US); Raghu Narayan Challa, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 200 days.

(21) Appl. No.: 17/443,207

(22) Filed: Jul. 22, 2021

(65) Prior Publication Data

US 2022/0030442 A1   Jan. 27, 2022

Related U.S. Application Data

(60) Provisional application No. 63/056,968, filed on Jul. 27, 2020.

(51) Int. Cl.
*H04W 16/28* (2009.01)
*H04B 7/0456* (2017.01)
(Continued)

(52) U.S. Cl.
CPC .......... *H04W 16/28* (2013.01); *H04B 7/0456* (2013.01); *H04B 7/0617* (2013.01);
(Continued)

(58) Field of Classification Search
CPC ..... H04W 16/28; H04W 24/10; H04W 76/15; H04W 48/16; H04B 7/0456; H04B 7/0617; H04B 7/0695; H04B 7/088
See application file for complete search history.

(56) References Cited

U.S. PATENT DOCUMENTS 7,620,420 B2 * 11/2009 Higuchi ............... H04B 7/0408
455/562.1
10,764,766 B2   9/2020 Mo et al.
(Continued)

FOREIGN PATENT DOCUMENTS

AU      2017323374 A1    3/2019
WO    WO-2016155776 A1 * 10/2016
WO    WO-2018048203 A1 *  3/2018  ............. H04B 7/024

OTHER PUBLICATIONS

International Search Report and Written Opinion—PCT/US2021/070939—ISA/EPO—dated Oct. 25, 2021.

*Primary Examiner* — Ayaz R Sheikh
*Assistant Examiner* — David Zhijun Sun
(74) *Attorney, Agent, or Firm* — Dalei Dong; Harrity & Harrity, LLP

(57) ABSTRACT

Various aspects of the present disclosure generally relate to wireless communication. In some aspects, a user equipment (UE) may perform a cell search using a first set of beams. The UE may determine a channel condition value based at least in part on performing the cell search. The UE may modify the channel condition value based at least in part on at least one of: the first set of beams used to perform the cell search, a beam selected from the first set of beams, or a second set of beams that is different from the first set of beams and that is included in a beamforming codebook associated with the UE. The UE may transmit a measurement report that includes the modified channel condition value. Numerous other aspects are provided.

30 Claims, 13 Drawing Sheets

(51) Int. Cl.
*H04B 7/06* (2006.01)
*H04W 24/10* (2009.01)
*H04W 76/15* (2018.01)

(52) U.S. Cl.
CPC .......... *H04B 7/0695* (2013.01); *H04W 24/10* (2013.01); *H04W 76/15* (2018.02)

(56) References Cited

U.S. PATENT DOCUMENTS

| | | |
|---|---|---|
| 10,979,917 B2 | 4/2021 | Luo et al. |
| 2019/0068270 A1 | 2/2019 | Schenk et al. |
| 2019/0246340 A1* | 8/2019 | Jung ..................... H04W 24/10 |
| 2019/0288766 A1 | 9/2019 | Ng et al. |
| 2020/0313744 A1 | 10/2020 | Hindy et al. |
| 2020/0322957 A1 | 10/2020 | Tomeba et al. |
| 2020/0367083 A1 | 11/2020 | Hao et al. |
| 2022/0110035 A1* | 4/2022 | Liberg .............. H04W 36/0085 |

* cited by examiner

TECHNIQUES FOR MODIFYING VALUES TRANSMITTED IN A MEASUREMENT REPORT FOR BEAM MANAGEMENT

CROSS-REFERENCE TO RELATED APPLICATION

This patent application claims priority to U.S. Provisional Patent Application No. 63/056,968, filed on Jul. 27, 2020, entitled "TECHNIQUES FOR MODIFYING VALUES TRANSMITTED IN A MEASUREMENT REPORT FOR BEAM MANAGEMENT," and assigned to the assignee hereof. The disclosure of the prior application is considered part of and is incorporated by reference into this patent application.

FIELD OF THE DISCLOSURE

Aspects of the present disclosure generally relate to wireless communication and to techniques and apparatuses for modifying values transmitted in a measurement report for beam management.

DESCRIPTION OF RELATED ART

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, and/or the like). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include a number of base stations (BSs) that can support communication for a number of user equipment (UEs). A user equipment (UE) may communicate with a base station (BS) via the downlink and uplink. The downlink (or forward link) refers to the communication link from the BS to the UE, and the uplink (or reverse link) refers to the communication link from the UE to the BS. As will be described in more detail herein, a BS may be referred to as a Node B, a gNB, an access point (AP), a radio head, a transmit receive point (TRP), a New Radio (NR) BS, a 5G Node B, and/or the like.

The above multiple access technologies have been adopted in various telecommunication standards to provide a common protocol that enables different user equipment to communicate on a municipal, national, regional, and even global level. New Radio (NR), which may also be referred to as 5G, is a set of enhancements to the LTE mobile standard promulgated by the Third Generation Partnership Project (3GPP). NR is designed to better support mobile broadband Internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink (DL), using CP-OFDM and/or SC-FDM (e.g., also known as discrete Fourier transform spread OFDM (DFT-s-OFDM)) on the uplink (UL), as well as supporting beamforming, multiple-input multiple-output (MIMO) antenna technology, and carrier aggregation. As the demand for mobile broadband access continues to increase, further improvements in LTE, NR, and other radio access technologies remain useful.

In a wireless network, a base station may configure a UE to measure and report channel condition values of beams so that the base station and/or the UE may perform one or more beam management procedures. For example, a UE may measure beams of a serving cell and may report the measurements to the base station according to a measurement configuration. Similarly, the UE may measure beams of one or more neighbor cells and may report the measurements to the base station according to a measurement configuration. The base station may receive the reported measurements from the UE and may perform one or more beam management procedures based at least in part on the reported measurements. For example, the base station may select a cell to add as a secondary cell group (SCG) (e.g., in a dual connectivity mode), may determine a best beam (or beam pair) for communications between the base station and the UE (e.g., a best base station transmit beam and/or a best UE receive beam), and/or may select a target cell for a handover procedure.

Some measurement configurations may result in poor beam management, such as sub-optimal beam selection. For example, a UE connected to a first cell (e.g., of a first base station and/or a first radio access technology (RAT)) may be configured with a measurement configuration for a cell selection procedure (e.g., an inter-RAT cell selection procedure). The cell selection procedure may configure a measurement event (e.g., a B1 measurement event) for reporting measurement values of a second cell (e.g., of a second base station, of the first RAT, and/or of a second RAT) to a base station associated with the first cell. The UE may detect and measure beams of the second cell using a wide beam (e.g., a beam that has not been refined, a beam that is not associated with a beamforming gain, a pseudo-omnidirectional beam, and/or a beam formed using a single antenna element). The UE may determine a channel condition value of a beam of the second cell (e.g., using the wide beam) to determine whether the channel condition value of the beam of the second cell satisfies or triggers the measurement event for reporting measurement values of a second cell to the base station associated with the first cell. However, performing measurements using a wide beam may not provide sufficient beamforming gain to the channel condition value of the beam of the second cell to satisfy or trigger the measurement event for reporting measurement values of a second cell to the base station associated with the first cell, and/or the reported channel condition value may not be sufficient to trigger addition of the second cell as part of an SCG.

For example, a UE with poor antenna coverage, a UE that is a customer premises equipment (CPE), and/or a UE that is a lower tier UE may not materialize sufficient beamforming gain using a wide beam when measuring the beam of the second cell to satisfy or trigger the measurement event for reporting measurement values of the second cell. For example, near a cell edge of the second cell, the UE may determine, using the wide beam, a poor (or lower) channel condition value of the beam of the second cell than if the beam of the second cell were measured by the UE using a narrow beam. As a result, the UE may not report the channel condition value of the beam of the second cell to the base station associated with the first cell. In this case, the base station may not add the second cell as part of an SCG, even where a measurement of the beam of the second cell by the UE using a more refined or narrow beam would have resulted in a channel condition value that would have satisfied or triggered the measurement event for reporting measurement values of a second cell to the base station. Thus, the measurement configuration may result in lower throughput than otherwise could be achieved if the second cell were added as part of an SCG.

SUMMARY

Some techniques and apparatuses described herein enable improved beam management, reduced battery consumption, improved network performance, and/or higher throughput. For example, a UE may modify channel condition values measured for a first set of beams (e.g., wider beams) to account for beamforming gain of a second set of beams (e.g., narrower beams) without actually measuring channel condition values for the second set of beams. In this way, the UE may conserve battery power and other UE resources (e.g., processing power and/or memory) by refraining from performing measurements using the second set of beams (e.g., which may have a larger search space than the first set of beams due to including more beams than the first set of beams) while improving network performance (e.g., via higher throughput, higher reliability, and/or lower latency) by enabling a cell to be added to an SCG if a modified channel condition value satisfies a threshold even if a corresponding (unmodified) channel condition value, measured using the first set of beams, does not satisfy the threshold.

Furthermore, the base station may configure or otherwise be associated with a time constraint for the UE to report beam measurements (e.g., after transmission of reference signals associated with beam measurements). The UE may be unable to satisfy this time constraint if the UE measures beam parameters using the second set of beams, which may include a greater number of beams than the first set of beams. Some techniques and apparatuses described herein enable the UE to satisfy such a time constraint by refraining from performing measurements using the second set of beams while improving network performance by enabling a cell to be added to an SCG as described above.

In accordance with the present disclosure, there is provided a method of wireless communication performed by a user equipment (UE), comprising: performing a cell search using a first set of beams; determining a channel condition value based at least in part on performing the cell search; modifying the channel condition value based at least in part on at least one of: the first set of beams used to perform the cell search, a beam selected from the first set of beams, or a second set of beams that is different from the first set of beams and that is included in a beamforming codebook associated with the UE; and transmitting a measurement report that includes the modified channel condition value. This enables the UE to transmit a measurement report, despite an actual measurement not satisfying the measurement reporting threshold, by accounting for beamforming gain that may result in a better channel condition than a channel condition indicated by the actual measurement. This beamforming gain may be estimated by the UE to conserve computing resources and reduce latency as compared to performing actual measurements using narrower beams (e.g., using the second set of beams).

In some aspects, the second set of beams is not used to perform the cell search. This may conserve computing resources and reduce latency as compared to performing actual measurements using narrower beams (e.g., using the second set of beams).

In some aspects, the cell search is performed in association with adding a cell for dual connectivity. This may improve network performance and increase throughput for the UE.

In some aspects, the channel condition value is modified based at least in part on at least two of: the first set of beams, the selected beam, or the second set of beams. This enables the UE to transmit a measurement report, despite an actual measurement not satisfying the measurement reporting threshold, by accounting for beamforming gain that may result in a better channel condition than a channel condition indicated by the actual measurement.

In some aspects, the channel condition value is modified based at least in part on the first set of beams, the selected beam, and the second set of beams. This enables the UE to transmit a measurement report, despite an actual measurement not satisfying the measurement reporting threshold, by accounting for beamforming gain that may result in a better channel condition than a channel condition indicated by the actual measurement.

In some aspects, the selected beam is a strongest beam measured in the first set of beams based at least in part on performing the cell search. This may improve throughput and reliability via selection of a strong beam.

In some aspects, the second set of beams have a spatial relationship with the selected beam. This may improve throughput and reliability via selection of a strong beam.

In some aspects, the channel condition value is modified further based at least in part on one or more gain parameters calculated for the second set of beams. These one or more gain parameters may be estimated by the UE to conserve computing resources and reduce latency as compared to performing actual measurements using narrower beams (e.g., using the second set of beams).

In some aspects, each of the one or more gain parameters corresponds to a maximum gain associated with the second set of beams in a respective direction. This enables the UE to transmit a measurement report, despite an actual measurement not satisfying the measurement reporting threshold, by accounting for a maximum beamforming gain that may result in a better channel condition than a channel condition indicated by the actual measurement. This maximum beamforming gain may be estimated by the UE to conserve computing resources and reduce latency as compared to performing actual measurements using narrower beams (e.g., using the second set of beams).

In some aspects, the channel condition value is modified further based at least in part on a third set of beams that have a spatial relationship with the selected beam. The third set of beams may be used to determine a gain matrix that assists with an accurate estimation of a beamforming gain. The beamforming gain may be estimated by the UE to conserve computing resources and reduce latency as compared to performing actual measurements using narrower beams (e.g., using the second set of beams).

In some aspects, the channel condition value is modified further based at least in part on one or more gain parameters calculated for the third set of beams. These one or more gain parameters may be estimated by the UE to conserve computing resources and reduce latency as compared to performing actual measurements using narrower beams (e.g., using the second set of beams).

In some aspects, each of the one or more gain parameters corresponds to a maximum gain associated with the third set of beams in a respective direction. This enables the UE to transmit a measurement report, despite an actual measurement not satisfying the measurement reporting threshold, by accounting for a maximum beamforming gain that may result in a better channel condition than a channel condition indicated by the actual measurement. This maximum beamforming gain may be estimated by the UE to conserve computing resources and reduce latency as compared to performing actual measurements using narrower beams (e.g., using the second set of beams).

In some aspects, modifying the channel condition value further comprises: identifying a first gain matrix for a third set of beams that is associated with a same antenna array as the selected beam and uses a same number of antenna elements as the first set of beams; identifying a second gain matrix for the second set of beams, wherein the second set of beams is associated with a same antenna array as the selected beam and uses more antenna elements than the first set of beams; calculating a potential gain matrix as a difference between the first gain matrix and the second gain matrix; calculating a nominal gain based at least in part on the potential gain matrix; and combining the nominal gain and the channel condition value to form the modified channel condition value. This assists with an accurate estimation of a beamforming gain. The beamforming gain may be estimated by the UE to conserve computing resources and reduce latency as compared to performing actual measurements using narrower beams (e.g., using the second set of beams).

In some aspects, the first set of beams use a single antenna element, and the second set of beams use multiple antenna elements. This beamforming gain may be estimated by the UE to conserve computing resources and reduce latency as compared to performing actual measurements using narrower beams (e.g., using the second set of beams), such as by using only actual measurements of wider beams (e.g., the first set of beams).

In some aspects, the channel condition value is modified further based at least in part on at least one of: a thermal mitigation factor, a geographic location of the UE, an estimated angle of a signal received by the UE or transmitted by the UE, a throughput requirement associated with the UE, a remaining battery charge of the UE, or a battery charging status of the UE. This assists with an accurate estimation of a beamforming gain.

In accordance with the present disclosure, there is further provided a UE for wireless communication, comprising a memory and one or more processors coupled to the memory, the one or more processors configured to: perform a cell search using a first set of beams; determine a channel condition value based at least in part on performing the cell search; modify the channel condition value based at least in part on at least one of: the first set of beams used to perform the cell search, a beam selected from the first set of beams, or a second set of beams that is different from the first set of beams and that is included in a beamforming codebook associated with the UE; and transmit a measurement report that includes the modified channel condition value. Example advantages associated with this aspect and other aspects described below are described above and elsewhere herein.

In some aspects, the second set of beams is not used to perform the cell search.

In some aspects, the cell search is performed in association with adding a cell for dual connectivity.

In some aspects, the channel condition value is modified based at least in part on at least two of: the first set of beams, the selected beam, or the second set of beams.

In some aspects, the channel condition value is modified based at least in part on the first set of beams, the selected beam, and the second set of beams.

In some aspects, the selected beam is a strongest beam measured in the first set of beams based at least in part on performing the cell search.

In some aspects, the second set of beams have a spatial relationship with the selected beam.

In some aspects, the channel condition value is modified further based at least in part on one or more gain parameters calculated for the second set of beams.

In some aspects, each of the one or more gain parameters corresponds to a maximum gain associated with the second set of beams in a respective direction.

In some aspects, the channel condition value is modified further based at least in part on a third set of beams that have a spatial relationship with the selected beam.

In some aspects, the channel condition value is modified further based at least in part on one or more gain parameters calculated for the third set of beams.

In some aspects, each of the one or more gain parameters corresponds to a maximum gain associated with the third set of beams in a respective direction.

In some aspects, the one or more processors, when modifying the channel condition value, are configured to: identify a first gain matrix for a third set of beams that is associated with a same antenna array as the selected beam and uses a same number of antenna elements as the first set of beams; identify a second gain matrix for the second set of beams, wherein the second set of beams is associated with a same antenna array as the selected beam and uses more antenna elements than the first set of beams; calculate a potential gain matrix as a difference between the first gain matrix and the second gain matrix; calculate a nominal gain based at least in part on the potential gain matrix; and combine the nominal gain and the channel condition value to form the modified channel condition value.

In some aspects, the first set of beams use a single antenna element, and the second set of beams use multiple antenna elements.

In some aspects, the channel condition value is modified further based at least in part on at least one of: a thermal mitigation factor, a geographic location of the UE, an estimated angle of a signal received by the UE or transmitted by the UE, a throughput requirement associated with the UE, a remaining battery charge of the UE, or a battery charging status of the UE.

In accordance with the present disclosure, there is further provided a non-transitory computer-readable medium storing a set of instructions for wireless communication, the set of instructions comprising: one or more instructions that, when executed by one or more processors of a UE, cause the UE to: perform a cell search using a first set of beams; determine a channel condition value based at least in part on performing the cell search; modify the channel condition value based at least in part on at least one of: the first set of beams used to perform the cell search, a beam selected from the first set of beams, or a second set of beams that is different from the first set of beams and that is included in a beamforming codebook associated with the UE; and transmit a measurement report that includes the modified channel condition value.

In some aspects, the second set of beams is not used to perform the cell search.

In some aspects, the cell search is performed in association with adding a cell for dual connectivity.

In some aspects, the channel condition value is modified based at least in part on at least two of: the first set of beams, the selected beam, or the second set of beams.

In some aspects, the channel condition value is modified based at least in part on the first set of beams, the selected beam, and the second set of beams.

In some aspects, the selected beam is a strongest beam measured in the first set of beams based at least in part on performing the cell search.

In some aspects, the second set of beams have a spatial relationship with the selected beam.

In some aspects, the channel condition value is modified further based at least in part on one or more gain parameters calculated for the second set of beams.

In some aspects, each of the one or more gain parameters corresponds to a maximum gain associated with the second set of beams in a respective direction.

In some aspects, the channel condition value is modified further based at least in part on a third set of beams that have a spatial relationship with the selected beam.

In some aspects, the channel condition value is modified further based at least in part on one or more gain parameters calculated for the third set of beams.

In some aspects, each of the one or more gain parameters corresponds to a maximum gain associated with the third set of beams in a respective direction.

In some aspects, the one or more instructions, that cause the UE to modify the channel condition value, cause the UE to: identify a first gain matrix for a third set of beams that is associated with a same antenna array as the selected beam and uses a same number of antenna elements as the first set of beams; identify a second gain matrix for the second set of beams, wherein the second set of beams is associated with a same antenna array as the selected beam and uses more antenna elements than the first set of beams; calculate a potential gain matrix as a difference between the first gain matrix and the second gain matrix; calculate a nominal gain based at least in part on the potential gain matrix; and combine the nominal gain and the channel condition value to form the modified channel condition value.

In some aspects, the first set of beams use a single antenna element, and the second set of beams use multiple antenna elements.

In some aspects, the channel condition value is modified further based at least in part on at least one of: a thermal mitigation factor, a geographic location of the UE, an estimated angle of a signal received by the UE or transmitted by the UE, a throughput requirement associated with the UE, a remaining battery charge of the UE, or a battery charging status of the UE.

In accordance with the present disclosure, there is further provided an apparatus for wireless communication, comprising: means for performing a cell search using a first set of beams; means for determining a channel condition value based at least in part on performing the cell search; means for modifying the channel condition value based at least in part on at least one of: the first set of beams used to perform the cell search, a beam selected from the first set of beams, or a second set of beams that is different from the first set of beams and that is included in a beamforming codebook associated with the apparatus; and means for transmitting a measurement report that includes the modified channel condition value.

In some aspects, the second set of beams is not used to perform the cell search.

In some aspects, the cell search is performed in association with adding a cell for dual connectivity.

In some aspects, the channel condition value is modified based at least in part on at least two of: the first set of beams, the selected beam, or the second set of beams.

In some aspects, the channel condition value is modified based at least in part on the first set of beams, the selected beam, and the second set of beams.

In some aspects, the selected beam is a strongest beam measured in the first set of beams based at least in part on performing the cell search.

In some aspects, the second set of beams have a spatial relationship with the selected beam.

In some aspects, the channel condition value is modified further based at least in part on one or more gain parameters calculated for the second set of beams.

In some aspects, each of the one or more gain parameters corresponds to a maximum gain associated with the second set of beams in a respective direction.

In some aspects, the channel condition value is modified further based at least in part on a third set of beams that have a spatial relationship with the selected beam.

In some aspects, the channel condition value is modified further based at least in part on one or more gain parameters calculated for the third set of beams.

In some aspects, each of the one or more gain parameters corresponds to a maximum gain associated with the third set of beams in a respective direction.

In some aspects, the means for modifying the channel condition value further comprises: means for identifying a first gain matrix for a third set of beams that is associated with a same antenna array as the selected beam and uses a same number of antenna elements as the first set of beams; means for identifying a second gain matrix for the second set of beams, wherein the second set of beams is associated with a same antenna array as the selected beam and uses more antenna elements than the first set of beams; means for calculating a potential gain matrix as a difference between the first gain matrix and the second gain matrix; means for calculating a nominal gain based at least in part on the potential gain matrix; and means for combining the nominal gain and the channel condition value to form the modified channel condition value.

In some aspects, the first set of beams use a single antenna element, and the second set of beams use multiple antenna elements.

In some aspects, the channel condition value is modified further based at least in part on at least one of: a thermal mitigation factor, a geographic location of the apparatus, an estimated angle of a signal received by the apparatus or transmitted by the apparatus, a throughput requirement associated with the apparatus, a remaining battery charge of the apparatus, or a battery charging status of the apparatus.

Aspects generally include a method, apparatus, system, computer program product, non-transitory computer-readable medium, user equipment, base station, wireless communication device, and/or processing system as substantially described herein with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, and/or the like (collectively referred to as "elements"). These elements may be implemented using hardware, software, or combinations thereof. Whether such elements are implemented as hardware or software depends upon the particular application and design constraints imposed on the overall system.

It should be noted that while aspects may be described herein using terminology commonly associated with a 5G or NR radio access technology (RAT), aspects of the present disclosure can be applied to other RATs, such as a 3G RAT, a 4G RAT, and/or a RAT subsequent to 5G (e.g., 6G).

Figure 1:
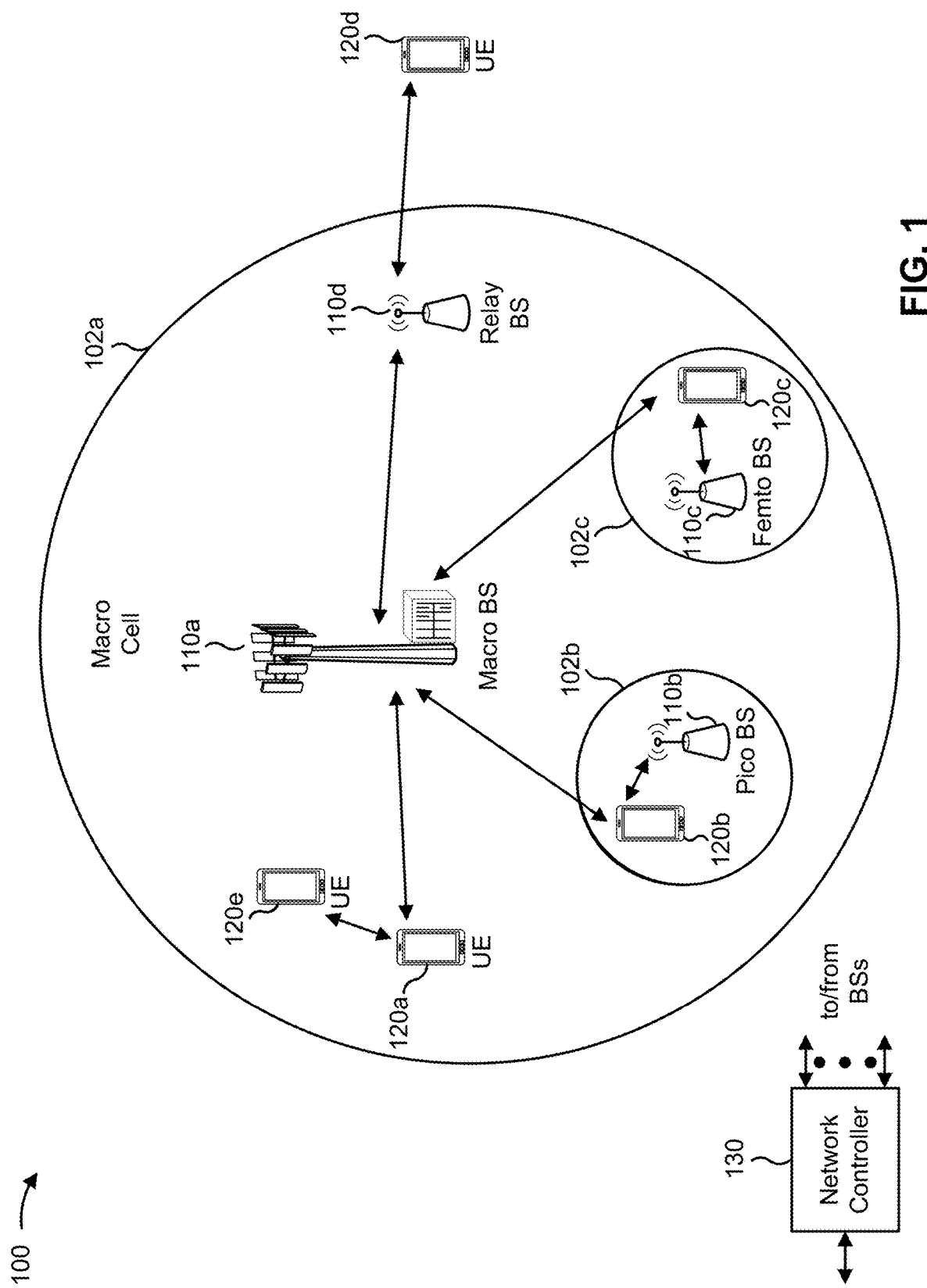
FIG. 1 is a diagram illustrating an example of a wireless network, in accordance with various aspects of the present disclosure.

FIG. 1 is a diagram illustrating an example of a wireless network 100, in accordance with various aspects of the present disclosure. The wireless network 100 may be or may include elements of a 5G (NR) network, an LTE network, and/or the like. The wireless network 100 includes a number of base stations 110 (shown as BS 110a, BS 110b, BS 110c, and BS 110d) and other network entities. A base station (BS) is an entity that communicates with user equipment (UEs) and may also be referred to as an NR BS, a Node B, a gNB, a 5G node B (NB), an access point, a transmit receive point (TRP), and/or the like. Each BS may provide communication coverage for a particular geographic area. In 3GPP, the term "cell" can refer to a coverage area of a BS and/or a BS subsystem serving this coverage area, depending on the context in which the term is used.

A BS may provide communication coverage for a macro cell, a pico cell, a femto cell, and/or another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). ABS for a macro cell may be referred to as a macro BS. ABS for a pico cell may be referred to as a pico BS. A BS for a femto cell may be referred to as a femto BS or a home BS. In the example shown in FIG. 1, a BS 110a may be a macro BS for a macro cell 102a, a BS 110b may be a pico BS for a pico cell 102b, and a BS 110c may be a femto BS for a femto cell 102c. A BS may support one or multiple (e.g., three) cells. The terms "eNB", "base station", "NR BS", "gNB", "TRP", "AP", "node B", "5G NB", and "cell" may be used interchangeably herein.

In some aspects, a cell may not necessarily be stationary, and the geographic area of the cell may move according to the location of a mobile BS. In some aspects, the BSs may be interconnected to one another and/or to one or more other BSs or network nodes (not shown) in the wireless network 100 through various types of backhaul interfaces such as a direct physical connection, a virtual network, and/or the like using any suitable transport network.

Wireless network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG. 1, a relay BS 110d communicates with macro BS 110a and a UE 120d in order to facilitate communication between BS 110a and UE 120d. A relay BS may also be referred to as a relay station, a relay base station, a relay, and/or the like.

Wireless network 100 may be a heterogeneous network that includes BSs of different types, e.g., macro BSs, pico BSs, femto BSs, relay BSs, and/or the like. These different types of BSs may have different transmit power levels, different coverage areas, and different impacts on interference in wireless network 100. For example, macro BSs may have a high transmit power level (e.g., 5 to 40 watts) whereas pico BSs, femto BSs, and relay BSs may have lower transmit power levels (e.g., 0.1 to 2 watts).

A network controller 130 may couple to a set of BSs and may provide coordination and control for these BSs. Network controller 130 may communicate with the BSs via a backhaul. The BSs may also communicate with one another, e.g., directly or indirectly via a wireless or wireline backhaul.

UEs 120 (e.g., 120a, 120b, 120c) may be dispersed throughout wireless network 100, and each UE may be stationary or mobile. A UE may also be referred to as an access terminal, a terminal, a mobile station, a subscriber unit, a station, and/or the like. A UE may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, a global positioning system device, or any other suitable device that is configured to communicate via a wireless or wired medium.

Some UEs may be considered machine-type communication (MTC) or evolved or enhanced machine-type communication (eMTC) UEs. MTC and eMTC UEs include, for example, robots, drones, remote devices, sensors, meters, monitors, location tags, and/or the like, that may communicate with a base station, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, and/or may be implemented as NB-IoT (narrowband internet of things) devices. Some UEs may be considered a Customer Premises Equipment (CPE). UE 120 may be included inside a housing that houses components of UE 120, such as processor components, memory components, and/or the like. In some aspects, the processor components and the memory components may be coupled together. For example, the processor components (e.g., one or more processors) and the memory components (e.g., a memory) may be operatively coupled, communicatively coupled, electronically coupled, electrically coupled, and/or the like.

In general, any number of wireless networks may be deployed in a given geographic area. Each wireless network may support a particular RAT and may operate on one or more frequencies. A RAT may also be referred to as a radio technology, an air interface, and/or the like. A frequency may also be referred to as a carrier, a frequency channel, and/or the like. Each frequency may support a single RAT in a given geographic area in order to avoid interference between wireless networks of different RATs. In some cases, NR or 5G RAT networks may be deployed.

In some aspects, two or more UEs 120 (e.g., shown as UE 120a and UE 120e) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, and/or the like), a mesh network, and/or the like. In this case, the UE 120 may perform scheduling operations, resource selection operations, and/or other operations described elsewhere herein as being performed by the base station 110.

Devices of wireless network 100 may communicate using the electromagnetic spectrum, which may be subdivided based on frequency or wavelength into various classes, bands, channels, and/or the like. For example, devices of wireless network 100 may communicate using an operating band having a first frequency range (FR1), which may span from 410 MHz to 7.125 GHz, and/or may communicate using an operating band having a second frequency range (FR2), which may span from 24.25 GHz to 52.6 GHz. The frequencies between FR1 and FR2 are sometimes referred to as mid-band frequencies. Although a portion of FR1 is greater than 6 GHz, FR1 is often referred to as a "sub-6 GHz" band. Similarly, FR2 is often referred to as a "millimeter wave" band despite being different from the extremely high frequency (EHF) band (30 GHz-300 GHz) which is identified by the International Telecommunications Union (ITU) as a "millimeter wave" band. Thus, unless specifically stated otherwise, it should be understood that the term "sub-6 GHz" or the like, if used herein, may broadly represent frequencies less than 6 GHz, frequencies within FR1, and/or mid-band frequencies (e.g., greater than 7.125 GHz). Similarly, unless specifically stated otherwise, it should be understood that the term "millimeter wave" or the like, if used herein, may broadly represent frequencies within the EHF band, frequencies within FR2, and/or mid-band frequencies (e.g., less than 24.25 GHz). It is contemplated that the frequencies included in FR1 and FR2 may be modified, and techniques described herein are applicable to those modified frequency ranges.

As indicated above, FIG. 1 is provided as an example. Other examples may differ from what is described with regard to FIG. 1.

Figure 2:
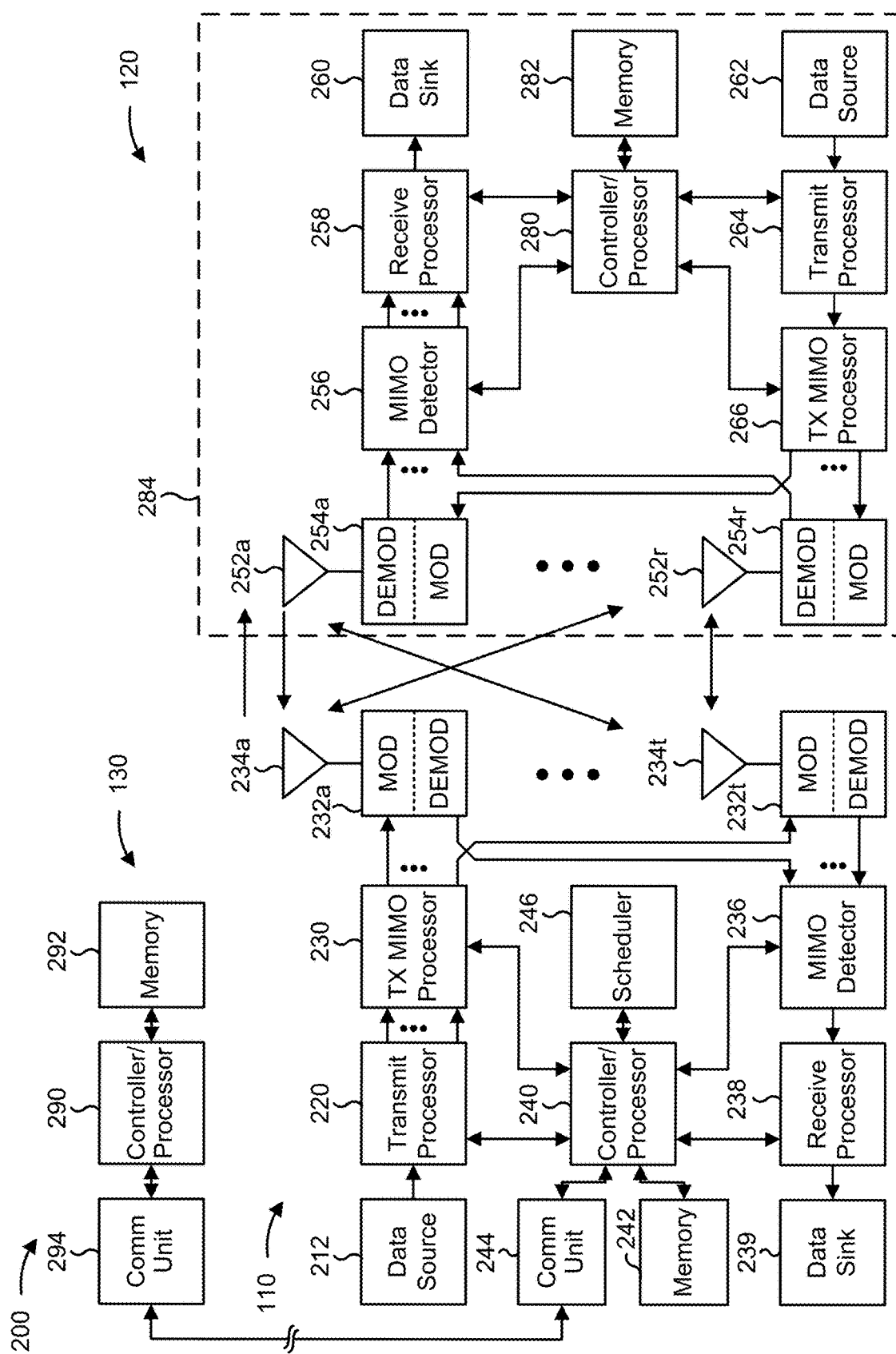
FIG. 2 is a diagram illustrating an example of a base station in communication with a user equipment (UE) in a wireless network, in accordance with various aspects of the present disclosure.

FIG. 2 is a diagram illustrating an example 200 of a base station 110 in communication with a UE 120 in a wireless network 100, in accordance with various aspects of the present disclosure. Base station 110 is equipped with T antennas 234a through 234t, and UE 120 is equipped with R antennas 252a through 252r, where in general T≥1 and R≥1.

At base station 110, a transmit processor 220 may receive data from a data source 212 for one or more UEs, select one or more modulation and coding schemes (MCS) for each UE based at least in part on channel quality indicators (CQIs) received from the UE, process (e.g., encode and modulate) the data for each UE based at least in part on the MCS(s) selected for the UE, and provide data symbols for all UEs. Transmit processor 220 may also process system information (e.g., for semi-static resource partitioning information (SRPI) and/or the like) and control information (e.g., CQI requests, grants, upper layer signaling, and/or the like) and provide overhead symbols and control symbols. Transmit processor 220 may also generate reference symbols for reference signals (e.g., the cell-specific reference signal (CRS), a demodulation reference signal (DMRS), and/or the like) and synchronization signals (e.g., the primary synchronization signal (PSS) and secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232a through 232t. Each modulator 232 may process a respective output symbol stream (e.g., for OFDM and/or the like) to obtain an output sample stream. Each modulator 232 may further process (e.g., convert to analog, amplify, filter, and upconvert) the output sample stream to obtain a downlink signal. T downlink signals from modulators 232a through 232t may be transmitted via T antennas 234a through 234t, respectively.

At UE 120, antennas 252a through 252r may receive the downlink signals from base station 110 and/or other base stations and may provide received signals to demodulators (DEMODs) 254a through 254r, respectively. Each demodulator 254 may condition (e.g., filter, amplify, downconvert, and digitize) a received signal to obtain input samples. Each demodulator 254 may further process the input samples (e.g., for OFDM and/or the like) to obtain received symbols. A MIMO detector 256 may obtain received symbols from all R demodulators 254a through 254r, perform MIMO detection on the received symbols if applicable, and provide detected symbols. A receive processor 258 may process (e.g., demodulate and decode) the detected symbols, provide decoded data for UE 120 to a data sink 260, and provide decoded control information and system information to a controller/processor 280. The term "controller/processor" may refer to one or more controllers, one or more processors, or a combination thereof. A channel processor may determine reference signal received power (RSRP), received signal strength indicator (RSSI), reference signal received quality (RSRQ), CQI, and/or the like. In some aspects, one or more components of UE 120 may be included in a housing 284.

Network controller 130 includes communication unit 294, controller/processor 290, and memory 292. Network controller 130 may include, for example, one or more devices in a core network. Network controller 130 communicates with base station 110 via communication unit 294.

Antennas (e.g., antennas 234a through 234t and/or antennas 252a through 252r) may include, or may be included within, one or more antenna panels, antenna groups, sets of antenna elements, and/or antenna arrays, among other examples. An antenna panel, an antenna group, a set of antenna elements, and/or an antenna array may include one or more antenna elements. An antenna panel, an antenna group, a set of antenna elements, and/or an antenna array may include a set of coplanar antenna elements and/or a set of non-coplanar antenna elements. An antenna panel, an antenna group, a set of antenna elements, and/or an antenna array may include antenna elements within a single housing and/or antenna elements within multiple housings. An antenna panel, an antenna group, a set of antenna elements, and/or an antenna array may include one or more antenna elements coupled to one or more transmission and/or reception components, such as one or more components of FIG. 2.

On the uplink, at UE 120, a transmit processor 264 may receive and process data from a data source 262 and control information (e.g., for reports that include RSRP, RSSI, RSRQ, CQI, and/or the like) from controller/processor 280. Transmit processor 264 may also generate reference symbols for one or more reference signals. The symbols from transmit processor 264 may be precoded by a TX MIMO processor 266 if applicable, further processed by modulators 254a through 254r (e.g., for DFT-s-OFDM, CP-OFDM, and/or the like), and transmitted to base station 110. In some aspects, the UE 120 includes a transceiver. The transceiver may include any combination of antenna(s) 252, modulators and/or demodulators 254, MIMO detector 256, receive processor 258, transmit processor 264, and/or TX MIMO processor 266. The transceiver may be used by a processor (e.g., controller/processor 280) and memory 282 to perform aspects of any of the methods described herein.

At base station 110, the uplink signals from UE 120 and other UEs may be received by antennas 234, processed by demodulators 232, detected by a MIMO detector 236 if applicable, and further processed by a receive processor 238 to obtain decoded data and control information sent by UE 120. Receive processor 238 may provide the decoded data to a data sink 239 and the decoded control information to controller/processor 240. Base station 110 includes communication unit 244 and communicate to network controller 130 via communication unit 244. Base station 110 includes a scheduler 246 to schedule UEs 120 for downlink and/or uplink communications. In some aspects, the base station 110 includes a transceiver. The transceiver may include any combination of antenna(s) 234, modulators and/or demodulators 232, MIMO detector 236, receive processor 238, transmit processor 220, and/or TX MIMO processor 230. The transceiver may be used by a processor (e.g., controller/processor 240) and memory 242 to perform aspects of any of the methods described herein.

Controller/processor 240 of base station 110, controller/processor 280 of UE 120, and/or any other component(s) of FIG. 2 may perform one or more techniques associated with modifying values transmitted in a measurement report for beam management, as described in more detail elsewhere herein. For example, controller/processor 240 of base station 110, controller/processor 280 of UE 120, and/or any other component(s) of FIG. 2 may perform or direct operations of, for example, process 1100 of FIG. 11 and/or other processes as described herein. Memories 242 and 282 may store data and program codes for base station 110 and UE 120, respectively. In some aspects, memory 242 and/or memory 282 may include a non-transitory computer-readable medium storing one or more instructions for wireless communication. For example, the one or more instructions, when executed (e.g., directly, or after compiling, converting, interpreting, and/or the like) by one or more processors of the base station 110 and/or the UE 120, may cause the one or more processors, the UE 120, and/or the base station 110 to perform or direct operations of, for example, process 1100 of FIG. 11 and/or other processes as described herein. In some aspects, executing instructions may include running the instructions, converting the instructions, compiling the instructions, interpreting the instructions, and/or the like.

In some aspects, UE 120 may include means for performing a cell search using a first set of beams; means for determining a channel condition value based at least in part on performing the cell search; means for modifying the channel condition value based at least in part on at least one of: the first set of beams used to perform the cell search, a beam selected from the first set of beams, or a second set of beams that is different from the first set of beams and that is included in a beamforming codebook associated with the apparatus; means for transmitting a measurement report that includes the modified channel condition value; and/or the like. In some aspects, the UE 120 may include means for identifying a first gain matrix for a third set of beams that is associated with a same antenna array as the selected beam and uses a same number of antenna elements as the first set of beams; means for identifying a second gain matrix for the second set of beams, wherein the second set of beams is associated with a same antenna array as the selected beam and uses more antenna elements than the first set of beams; means for calculating a potential gain matrix as a difference between the first gain matrix and the second gain matrix; means for calculating a nominal gain based at least in part on the potential gain matrix; means for combining the nominal gain and the channel condition value to form the modified channel condition value; and/or the like. In some aspects, such means may include one or more components of UE 120 described in connection with FIG. 2, such as controller/processor 280, transmit processor 264, TX MIMO processor 266, MOD 254, antenna 252, DEMOD 254, MIMO detector 256, receive processor 258, and/or the like.

As indicated above, FIG. 2 is provided as an example. Other examples may differ from what is described with regard to FIG. 2.

Figure 3:
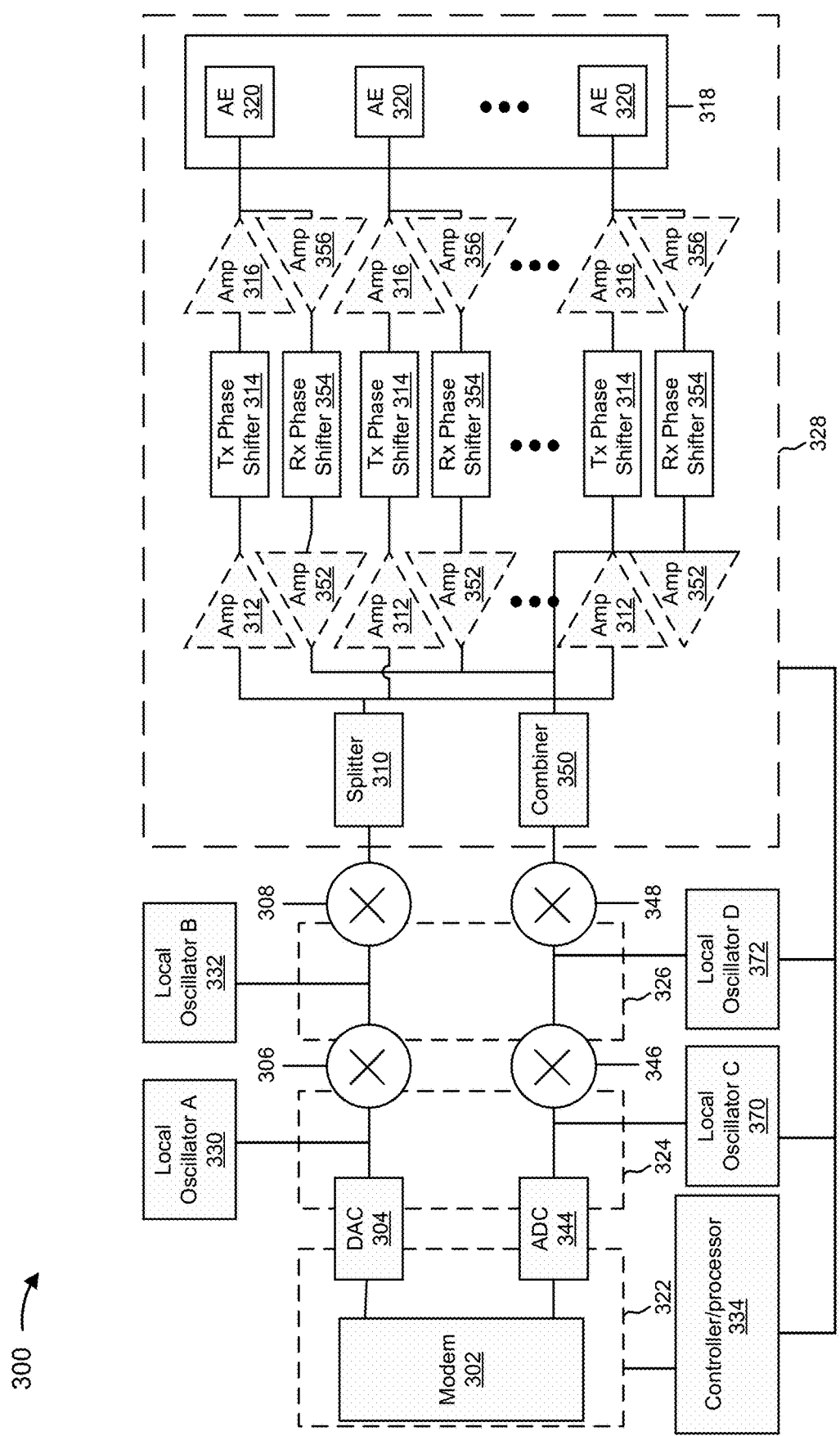
FIG. 3 is a diagram illustrating an example beamforming architecture that supports beamforming for millimeter wave (mmW) communications, in accordance with various aspects of the present disclosure.

FIG. 3 is a diagram illustrating an example beamforming architecture 300 that supports beamforming for millimeter wave (mmW) communications, in accordance with various aspects of the present disclosure. In some aspects, architecture 300 may implement aspects of wireless network 100. In some aspects, architecture 300 may be implemented in a transmitting device (e.g., a first wireless communication device, UE, or base station) and/or a receiving device (e.g., a second wireless communication device, UE, or base station), as described herein.

Broadly, FIG. 3 is a diagram illustrating example hardware components of a wireless communication device in accordance with certain aspects of the disclosure. The illustrated components may include those that may be used for antenna element selection and/or for beamforming for transmission of wireless signals. There are numerous architectures for antenna element selection and implementing phase shifting, only one example of which is illustrated here. The architecture 300 includes a modem (modulator/demodulator) 302, a digital to analog converter (DAC) 304, a first mixer 306, a second mixer 308, and a splitter 310. The architecture 300 also includes multiple first amplifiers 312, multiple phase shifters 314, multiple second amplifiers 316, and an antenna array 318 that includes multiple antenna elements 320.

Transmission lines or other waveguides, wires, traces, and/or the like are shown connecting the various components to illustrate how signals to be transmitted may travel between components. Reference numbers 322, 324, 326, and 328 indicate regions in the architecture 300 in which different types of signals travel or are processed. Specifically, reference number 322 indicates a region in which digital baseband signals travel or are processed, reference number 324 indicates a region in which analog baseband signals travel or are processed, reference number 326 indicates a region in which analog intermediate frequency (IF) signals travel or are processed, and reference number 328 indicates a region in which analog radio frequency (RF) signals travel or are processed. The architecture also includes a local oscillator A 330, a local oscillator B 332, and a controller/processor 334. In some aspects, controller/processor 334 corresponds to controller/processor 240 of the UE described above in connection with FIG. 2 and/or controller/processor 280 of the base station 110 described above in connection with FIG. 2.

Each of the antenna elements 320 may include one or more sub-elements for radiating or receiving RF signals. For example, a single antenna element 320 may include a first sub-element cross-polarized with a second sub-element that can be used to independently transmit cross-polarized signals. The antenna elements 320 may include patch antennas, dipole antennas, or other types of antennas arranged in a linear pattern, a two dimensional pattern, or another pattern. A spacing between antenna elements 320 may be such that signals with a desired wavelength transmitted separately by the antenna elements 320 may interact or interfere (e.g., to form a desired beam). For example, given an expected range of wavelengths or frequencies, the spacing may provide a quarter wavelength, half wavelength, or other fraction of a wavelength of spacing between neighboring antenna elements 320 to allow for interaction or interference of signals transmitted by the separate antenna elements 320 within that expected range.

The modem 302 processes and generates digital baseband signals and may also control operation of the DAC 304, first and second mixers 306, 308, splitter 310, first amplifiers 312, phase shifters 314, and/or the second amplifiers 316 to transmit signals via one or more or all of the antenna elements 320. The modem 302 may process signals and control operation in accordance with a communication standard such as a wireless standard discussed herein. The DAC 304 may convert digital baseband signals received from the modem 302 (and that are to be transmitted) into analog baseband signals. The first mixer 306 upconverts analog baseband signals to analog IF signals within an IF using a local oscillator A 330. For example, the first mixer 306 may mix the signals with an oscillating signal generated by the local oscillator A 330 to "move" the baseband analog signals to the IF. In some cases, some processing or filtering (not shown) may take place at the IF. The second mixer 308 upconverts the analog IF signals to analog RF signals using the local oscillator B 332. Similar to the first mixer, the second mixer 308 may mix the signals with an oscillating signal generated by the local oscillator B 332 to "move" the IF analog signals to the RF or the frequency at which signals will be transmitted or received. The modem 302 and/or the controller/processor 334 may adjust the frequency of local oscillator A 330 and/or the local oscillator B 332 so that a desired IF and/or RF frequency is produced and used to facilitate processing and transmission of a signal within a desired bandwidth.

In the illustrated architecture 300, signals upconverted by the second mixer 308 are split or duplicated into multiple signals by the splitter 310. The splitter 310 in architecture 300 splits the RF signal into multiple identical or nearly identical RF signals. In other examples, the split may take place with any type of signal, including with baseband digital, baseband analog, or IF analog signals. Each of these signals may correspond to an antenna element 320, and the signal travels through and is processed by amplifiers 312, 316, phase shifters 314, and/or other elements corresponding to the respective antenna element 320 to be provided to and transmitted by the corresponding antenna element 320 of the antenna array 318. In one example, the splitter 310 may be an active splitter that is connected to a power supply and provides some gain so that RF signals exiting the splitter 310 are at a power level equal to or greater than the signal entering the splitter 310. In another example, the splitter 310 is a passive splitter that is not connected to power supply and the RF signals exiting the splitter 310 may be at a power level lower than the RF signal entering the splitter 310.

After being split by the splitter 310, the resulting RF signals may enter an amplifier, such as a first amplifier 312, or a phase shifter 314 corresponding to an antenna element 320. The first and second amplifiers 312, 316 are illustrated with dashed lines because one or both of them might not be necessary in some aspects. In some aspects, both the first amplifier 312 and second amplifier 316 are present. In some aspects, neither the first amplifier 312 nor the second amplifier 316 is present. In some aspects, one of the two amplifiers 312, 316 is present but not the other. By way of example, if the splitter 310 is an active splitter, the first amplifier 312 may not be used. By way of further example, if the phase shifter 314 is an active phase shifter that can provide a gain, the second amplifier 316 might not be used.

The amplifiers 312, 316 may provide a desired level of positive or negative gain. A positive gain (positive dB) may be used to increase an amplitude of a signal for radiation by a specific antenna element 320. A negative gain (negative dB) may be used to decrease an amplitude and/or suppress radiation of the signal by a specific antenna element. Each of the amplifiers 312, 316 may be controlled independently (e.g., by the modem 302 or the controller/processor 334) to provide independent control of the gain for each antenna element 320. For example, the modem 302 and/or the controller/processor 334 may have at least one control line connected to each of the splitter 310, first amplifiers 312, phase shifters 314, and/or second amplifiers 316 that may be used to configure a gain to provide a desired amount of gain for each component and thus each antenna element 320.

The phase shifter 314 may provide a configurable phase shift or phase offset to a corresponding RF signal to be transmitted. The phase shifter 314 may be a passive phase shifter not directly connected to a power supply. Passive phase shifters might introduce some insertion loss. The second amplifier 316 may boost the signal to compensate for the insertion loss. The phase shifter 314 may be an active phase shifter connected to a power supply such that the active phase shifter provides some amount of gain or prevents insertion loss. The settings of each of the phase shifters 314 are independent, meaning that each can be independently set to provide a desired amount of phase shift or the same amount of phase shift or some other configuration. The modem 302 and/or the controller/processor 334 may have at least one control line connected to each of the phase shifters 314 and which may be used to configure the phase shifters 314 to provide a desired amount of phase shift or phase offset between antenna elements 320.

In the illustrated architecture 300, RF signals received by the antenna elements 320 are provided to one or more first amplifiers 356 to boost the signal strength. The first amplifiers 356 may be connected to the same antenna arrays 318 (e.g., for time division duplex (TDD) operations). The first amplifiers 356 may be connected to different antenna arrays 318. The boosted RF signal is input into one or more phase shifters 354 to provide a configurable phase shift or phase offset for the corresponding received RF signal to enable reception via one or more Rx beams. The phase shifter 354 may be an active phase shifter or a passive phase shifter. The settings of the phase shifters 354 are independent, meaning that each can be independently set to provide a desired amount of phase shift or the same amount of phase shift or some other configuration. The modem 302 and/or the controller/processor 334 may have at least one control line connected to each of the phase shifters 354 and which may be used to configure the phase shifters 354 to provide a desired amount of phase shift or phase offset between antenna elements 320 to enable reception via one or more Rx beams.

The outputs of the phase shifters 354 may be input to one or more second amplifiers 352 for signal amplification of the phase shifted received RF signals. The second amplifiers 352 may be individually configured to provide a configured amount of gain. The second amplifiers 352 may be individually configured to provide an amount of gain to ensure that the signals input to combiner 350 have the same magnitude. The amplifiers 352 and/or 356 are illustrated in dashed lines because they might not be necessary in some aspects. In some aspects, both the amplifier 352 and the amplifier 356 are present. In another aspect, neither the amplifier 352 nor the amplifier 356 are present. In other aspects, one of the amplifiers 352, 356 is present but not the other.

In the illustrated architecture 300, signals output by the phase shifters 354 (via the amplifiers 352 when present) are combined in combiner 350. The combiner 350 in architecture 300 combines the RF signal into a signal. The combiner 350 may be a passive combiner (e.g., not connected to a power source), which may result in some insertion loss. The combiner 350 may be an active combiner (e.g., connected to a power source), which may result in some signal gain. When combiner 350 is an active combiner, it may provide a different (e.g., configurable) amount of gain for each input signal so that the input signals have the same magnitude when they are combined. When combiner 350 is an active combiner, the combiner 350 may not need the second amplifier 352 because the active combiner may provide the signal amplification.

The output of the combiner 350 is input into mixers 348 and 346. Mixers 348 and 346 generally down convert the received RF signal using inputs from local oscillators 372 and 370, respectively, to create intermediate or baseband signals that carry the encoded and modulated information. The output of the mixers 348 and 346 are input into an analog-to-digital converter (ADC) 344 for conversion to analog signals. The analog signals output from ADC 344 is input to modem 302 for baseband processing, such as decoding, de-interleaving, and/or the like.

The architecture 300 is given by way of example only to illustrate an architecture for transmitting and/or receiving signals. In some cases, the architecture 300 and/or each portion of the architecture 300 may be repeated multiple times within an architecture to accommodate or provide an arbitrary number of RF chains, antenna elements, and/or antenna panels. Furthermore, numerous alternate architectures are possible and contemplated. For example, although only a single antenna array 318 is shown, two, three, or more antenna arrays may be included, each with one or more of their own corresponding amplifiers, phase shifters, splitters, mixers, DACs, ADCs, and/or modems. For example, a single UE may include two, four, or more antenna arrays for transmitting or receiving signals at different physical locations on the UE or in different directions.

Furthermore, mixers, splitters, amplifiers, phase shifters and other components may be located in different signal type areas (e.g., represented by different ones of the reference numbers 322, 324, 326, 328) in different implemented architectures. For example, a split of the signal to be transmitted into multiple signals may take place at the analog RF, analog IF, analog baseband, or digital baseband frequencies in different examples. Similarly, amplification and/or phase shifts may also take place at different frequencies. For example, in some aspects, one or more of the splitter 310, amplifiers 312, 316, or phase shifters 314 may be located between the DAC 304 and the first mixer 306 or between the first mixer 306 and the second mixer 308. In one example, the functions of one or more of the components may be combined into one component. For example, the phase shifters 314 may perform amplification to include or replace the first and/or or second amplifiers 312, 316. By way of another example, a phase shift may be implemented by the second mixer 308 to obviate the need for a separate phase shifter 314. This technique is sometimes called local oscillator (LO) phase shifting. In some aspects of this configuration, there may be multiple IF to RF mixers (e.g., for each antenna element chain) within the second mixer 308, and the local oscillator B 332 may supply different local oscillator signals (with different phase offsets) to each IF to RF mixer.

The modem 302 and/or the controller/processor 334 may control one or more of the other components 304 through 372 to select one or more antenna elements 320 and/or to form beams for transmission of one or more signals. For example, the antenna elements 320 may be individually selected or deselected for transmission of a signal (or signals) by controlling an amplitude of one or more corresponding amplifiers, such as the first amplifiers 312 and/or the second amplifiers 316. Beamforming includes generation of a beam using multiple signals on different antenna elements, where one or more or all of the multiple signals are shifted in phase relative to each other. The formed beam may carry physical or higher layer reference signals or information. As each signal of the multiple signals is radiated from a respective antenna element 320, the radiated signals interact, interfere (constructive and destructive interference), and amplify each other to form a resulting beam. The shape (such as the amplitude, width, and/or presence of side lobes) and the direction (such as an angle of the beam relative to a surface of the antenna array 318) can be dynamically controlled by modifying the phase shifts or phase offsets imparted by the phase shifters 314 and amplitudes imparted by the amplifiers 312, 316 of the multiple signals relative to each other. The controller/processor 334 may be located partially or fully within one or more other components of the architecture 300. For example, the controller/processor 334 may be located within the modem 302 in some aspects.

As indicated above, FIG. 3 is provided as an example. Other examples may differ from what is described with regard to FIG. 3.

Figure 4:
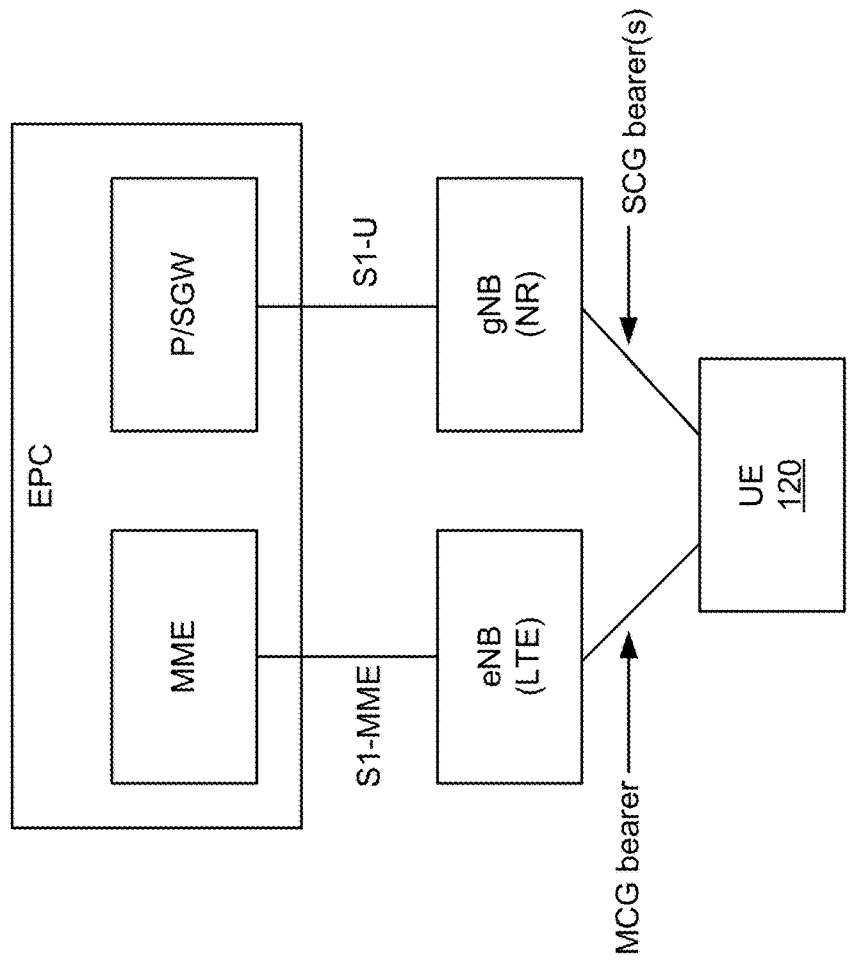
FIG. 4 is a diagram illustrating an example of dual connectivity, in accordance with various aspects of the present disclosure.

FIG. 4 is a diagram illustrating an example 400 of dual connectivity, in accordance with various aspects of the present disclosure. The example shown in FIG. 4 is for an Evolved Universal Mobile Telecommunications System Terrestrial Radio Access (E-UTRA)-NR dual connectivity (ENDC) mode. In the ENDC mode, a UE 120 communicates using an LTE RAT on a master cell group (MCG), and the UE 120 communicates using an NR RAT on a secondary cell group (SCG). However, aspects described herein may apply to an ENDC mode (e.g., where the MCG is associated with an LTE RAT and the SCG is associated with an NR RAT), an NR-E-UTRA dual connectivity (NEDC) mode (e.g., where the MCG is associated with an NR RAT and the SCG is associated with an LTE RAT), an NR dual connectivity (NRDC) mode (e.g., where the MCG is associated with an NR RAT and the SCG is also associated with the NR RAT), or another dual connectivity mode (e.g., (e.g., where the MCG is associated with a first RAT and the SCG is associated with one of the first RAT or a second RAT). The ENDC mode is sometimes referred to as an NR or 5G non-standalone (NSA) mode. Thus, as used herein, a dual connectivity mode may refer to an ENDC mode, a NEDC mode, an NRDC mode, and/or another type of dual connectivity mode.

As shown in FIG. 4, a UE 120 may communicate with both an eNB (e.g., a 4G base station 110) and a gNB (e.g., a 5G base station 110), and the eNB and the gNB may communicate (e.g., directly or indirectly) with a 4G/LTE core network, shown as an evolved packet core (EPC) that includes a mobility management entity (MME), a packet data network gateway (PGW), a serving gateway (SGW), and/or the like. In FIG. 4, the PGW and the SGW are shown collectively as P/SGW. In some aspects, the eNB and the gNB may be co-located at the same base station 110. In some aspects, the eNB and the gNB may be included in different base stations 110 (e.g., may not be co-located).

As further shown in FIG. 4, in some aspects, a wireless network that permits operation in a 5G NSA mode may permit such operations using an MCG for a first RAT (e.g., an LTE RAT, a 4G RAT, and/or the like) and an SCG for a second RAT (e.g., an NR RAT, a 5G RAT, and/or the like). In this case, the UE 120 may communicate with the eNB via the MCG and may communicate with the gNB via the SCG. In some aspects, the MCG may anchor a network connection between the UE 120 and the 4G/LTE core network (e.g., for mobility, coverage, control plane information, and/or the like), and the SCG may be added as additional carriers to increase throughput (e.g., for data traffic, user plane information, and/or the like). In some aspects, the gNB and the eNB may not transfer user plane information between one another. In some aspects, a UE 120 operating in a dual connectivity mode may be concurrently connected with an LTE base station 110 (e.g., an eNB) and an NR base station 110 (e.g., a gNB) (e.g., in the case of ENDC or NEDC), or may be concurrently connected with one or more base stations 110 that use the same RAT (e.g., in the case of NRDC). In some aspects, the MCG may be associated with a first frequency band (e.g., a sub-6 GHz band and/or an FR1 band) and the SCG may be associated with a second frequency band (e.g., a millimeter wave band and/or an FR2 band).

The UE 120 may communicate via the MCG and the SCG using one or more radio bearers (e.g., data radio bearers (DRBs), signaling radio bearers (SRBs), and/or the like). For example, the UE 120 may transmit or receive data via the MCG and/or the SCG using one or more DRBs. Similarly, the UE 120 may transmit or receive control information (e.g., radio resource control (RRC) information, measurement reports, and/or the like) using one or more SRBs. In some aspects, a radio bearer may be dedicated to a specific cell group (e.g., a radio bearer may be an MCG bearer, an SCG bearer, and/or the like). In some aspects, a radio bearer may be a split radio bearer. A split radio bearer may be split in the uplink and/or in the downlink. For example, a DRB may be split on the downlink (e.g., the UE 120 may receive downlink information for the MCG or the SCG in the DRB) but not on the uplink (e.g., the uplink may be non-split with a primary path to the MCG or the SCG, such that the UE 120 transmits in the uplink only on the primary path). In some aspects, a DRB may be split on the uplink with a primary path to the MCG or the SCG. A DRB that is split in the uplink may transmit data using the primary path until a size of an uplink transmit buffer satisfies an uplink data split threshold. If the uplink transmit buffer satisfies the uplink data split threshold, the UE 120 may transmit data to the MCG or the SCG using the DRB.

As indicated above, FIG. 4 is provided as an example. Other examples may differ from what is described with respect to FIG. 4.

Figure 5:
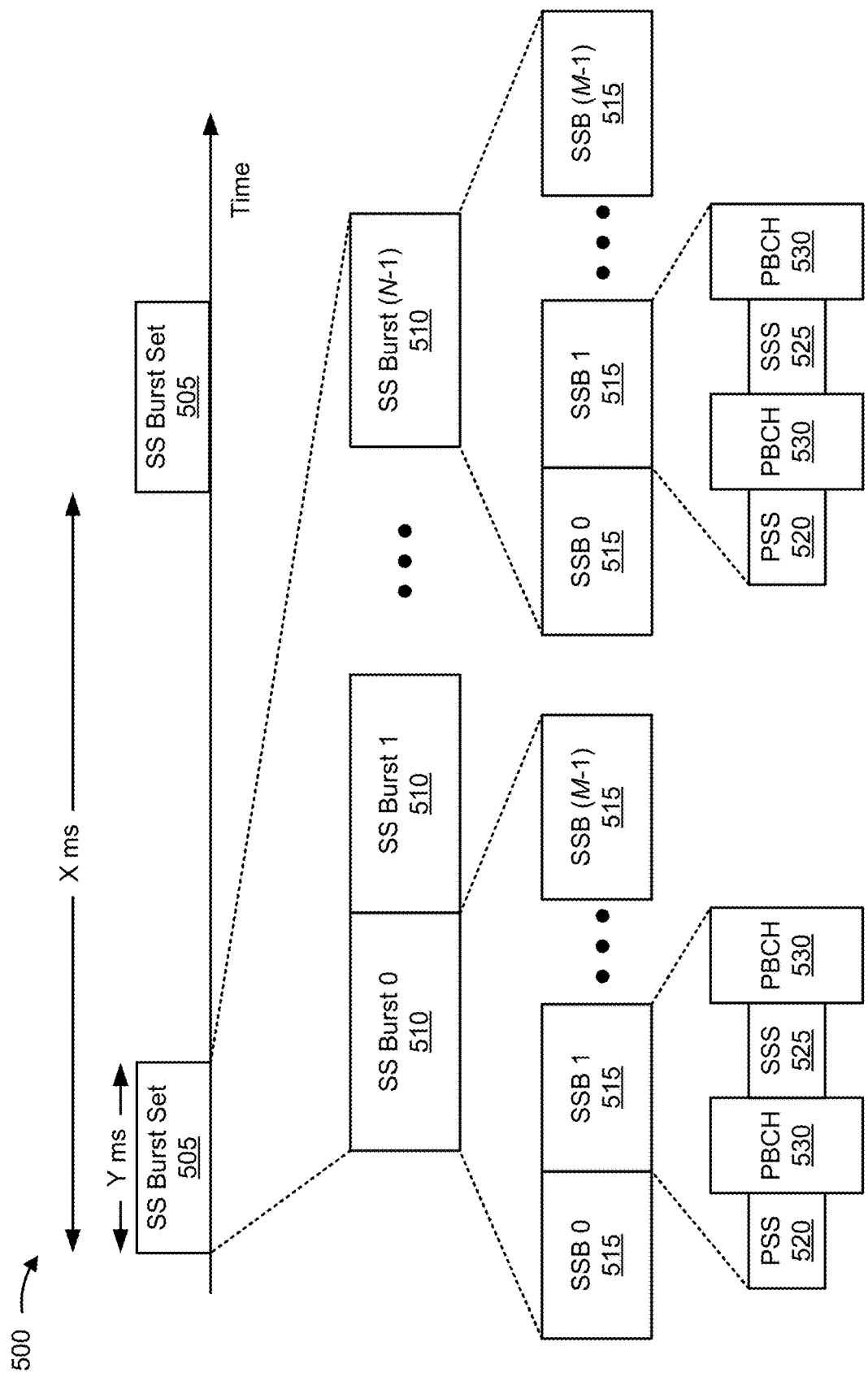
FIG. 5 is a diagram illustrating an example of a synchronization signal (SS) hierarchy, in accordance with various aspects of the present disclosure.

FIG. 5 is a diagram illustrating an example 500 of a synchronization signal (SS) hierarchy, in accordance with various aspects of the present disclosure. As shown in FIG. 5, the SS hierarchy includes an SS burst set 505, which includes multiple SS bursts 510, shown as SS burst 0 through SS burst N−1, where N is a maximum number of repetitions of the SS burst 510 that may be transmitted by the base station. As further shown, each SS burst 510 includes one or more SS blocks (SSBs) 515, shown as SSB 0 through SSB M−1, where M is a maximum number of SSBs 515 that can be carried by an SS burst 510. In some aspects, different SSBs 515 may be beam-formed differently (e.g., transmitted using different beams), and may be used for cell search, cell acquisition, beam management, beam selection, and/or the like (e.g., as part of an initial network access procedure). An SS burst set 505 may be periodically transmitted by a wireless node (e.g., base station 110), such as every X milliseconds, as shown in FIG. 5. In some aspects, an SS burst set 505 may have a fixed or dynamic length, shown as Y milliseconds in FIG. 5. In some cases, an SS burst set 505 or an SS burst 510 may be referred to as a discovery reference signal (DRS) transmission window, an SSB measurement time configuration (SMTC) window, and/or the like.

In some aspects, an SSB 515 may include resources that carry a PSS 520, an SSS 525, a physical broadcast channel (PBCH) 530, and/or the like. In some aspects, multiple SSBs 515 are included in an SS burst 510 (e.g., with transmission on different beams), and the PSS 520, the SSS 525, and/or the PBCH 530 may be the same across each SSB 515 of the SS burst 510. In some aspects, a single SSB 515 may be included in an SS burst 510. In some aspects, the SSB 515 may be at least four symbols (e.g., OFDM symbols) in length, where each symbol carries one or more of the PSS 520 (e.g., occupying one symbol), the SSS 525 (e.g., occupying one symbol), and/or the PBCH 530 (e.g., occupying two symbols). In some aspects, an SSB 515 may be referred to as an SS/PBCH block.

In some aspects, the symbols of an SSB 515 are consecutive, as shown in FIG. 5. In some aspects, the symbols of an SSB 515 are non-consecutive. Similarly, in some aspects, one or more SSBs 515 of the SS burst 510 may be transmitted in consecutive radio resources (e.g., consecutive symbols) during one or more slots. Additionally, or alternatively, one or more SSBs 515 of the SS burst 510 may be transmitted in non-consecutive radio resources.

In some aspects, the SS bursts 510 may have a burst period, and the SSBs 515 of the SS burst 510 may be transmitted by a wireless node (e.g., base station 110) according to the burst period. In this case, the SSBs 515 may be repeated during each SS burst 510. In some aspects, the SS burst set 505 may have a burst set periodicity, whereby the SS bursts 510 of the SS burst set 505 are transmitted by the wireless node according to the fixed burst set periodicity. In other words, the SS bursts 510 may be repeated during each SS burst set 505.

In some aspects, an SSB 515 may include an SSB index, which may correspond to a beam used to carry the SSB 515. A UE 120 may monitor for and/or measure SSBs 515 using different receive (Rx) beams during an initial network access procedure and/or a cell search procedure, among other examples. Based at least in part on the monitoring and/or measuring, the UE 120 may indicate one or more SSBs 515 with a best signal parameter (e.g., an RSRP parameter and/or the like) to a base station 110. The base station 110 and the UE 120 may use the one or more indicated SSBs 515 to select one or more beams to be used for communication between the base station 110 and the UE 120 (e.g., for a random access channel (RACH) procedure and/or the like). Additionally, or alternatively, the UE 120 may use the SSB 515 and/or the SSB index to determine a cell timing for a cell via which the SSB 515 is received (e.g., a serving cell).

As indicated above, FIG. 5 is provided as an example. Other examples may differ from what is described with regard to FIG. 5.

Figure 6:
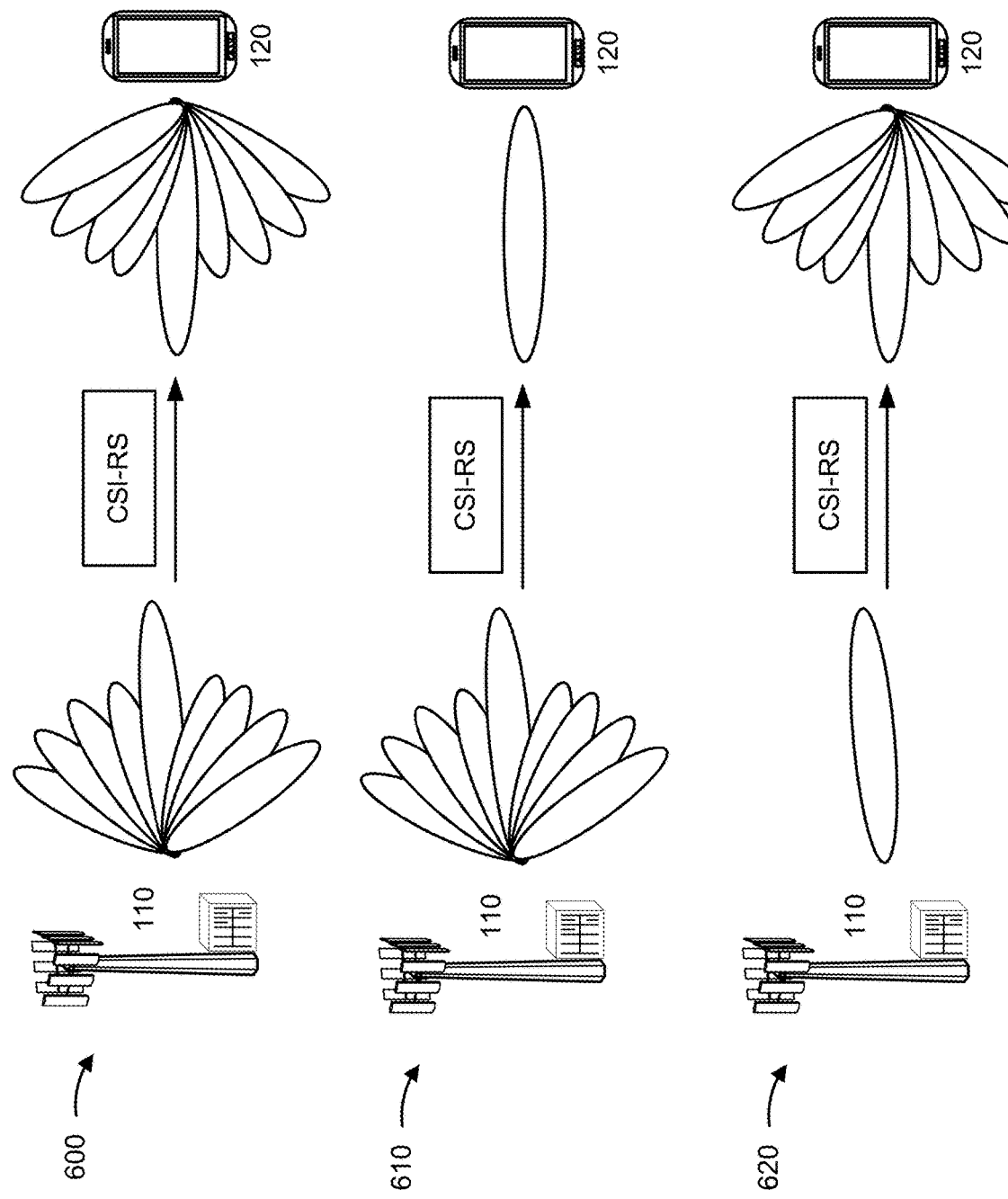
FIG. 6 is a diagram illustrating examples of channel state information reference signal (CSI-RS) beam management procedures, in accordance with various aspects of the present disclosure.

FIG. 6 is a diagram illustrating examples 600, 610, and 620 of CSI-RS beam management procedures, in accordance with various aspects of the present disclosure. As shown in FIG. 6, examples 600, 610, and 620 include a UE 120 in communication with a base station 110 in a wireless network (e.g., wireless network 100). However, the devices shown in FIG. 6 are provided as examples, and the wireless network may support communication and beam management between other devices (e.g., between a UE 120 and a base station 110 or TRP, between a mobile termination node and a control node, between an integrated access and backhaul (IAB) child node and an IAB parent node, between a scheduled node and a scheduling node, and/or the like). In some aspects, the UE 120 and the base station 110 may be in a connected state (e.g., an RRC connected state and/or the like).

As shown in FIG. 6, example 600 includes a base station 110 and a UE 120 communicating to perform beam management using CSI-RSs. Example 600 depicts a first beam management procedure (e.g., P1 CSI-RS beam management). The first beam management procedure may be referred to as a beam selection procedure, an initial beam acquisition procedure, a beam sweeping procedure, a cell search procedure, a beam search procedure, and/or the like. As shown in FIG. 6 and example 600, CSI-RSs may be configured to be transmitted from the base station 110 to the UE 120. The CSI-RSs may be configured to be periodic (e.g., using RRC signaling and/or the like), semi-persistent (e.g., using media access control (MAC) control element (MAC-CE) signaling and/or the like), and/or aperiodic (e.g., using downlink control information (DCI) and/or the like).

The first beam management procedure may include the base station 110 performing beam sweeping over multiple transmit (Tx) beams. The base station 110 may transmit a CSI-RS using each transmit beam for beam management. To enable the UE 120 to perform receive (Rx) beam sweeping, the base station may use a transmit beam to transmit (e.g., with repetitions) each CSI-RS at multiple times within the same RS resource set so that the UE 120 can sweep through receive beams in multiple transmission instances. For example, if the base station 110 has a set of N transmit beams and the UE 120 has a set of M receive beams, the CSI-RS may be transmitted on each of the N transmit beams M times so that the UE 120 may receive M instances of the CSI-RS per transmit beam. In other words, for each transmit beam of the base station 110, the UE 120 may perform beam sweeping through the receive beams of the UE 120. As a result, the first beam management procedure may enable the UE 120 to measure a CSI-RS on different transmit beams using different receive beams to support selection of base station 110 transmit beams/UE 120 receive beam(s) or beam pair(s). The UE 120 may report the measurements to the base station 110 to enable the base station 110 to select one or more beam pair(s) for communication between the base station 110 and the UE 120. While example 600 has been described in connection with CSI-RSs, the first beam management process may also use SSBs for beam management in a similar manner as described above.

As shown in FIG. 6, example 610 includes a base station 110 and a UE 120 communicating to perform beam management using CSI-RSs. Example 610 depicts a second beam management procedure (e.g., P2 CSI-RS beam management). The second beam management procedure may be referred to as a beam refinement procedure, a base station beam refinement procedure, a TRP beam refinement procedure, a transmit beam refinement procedure, and/or the like. As shown in FIG. 6 and example 610, CSI-RSs may be configured to be transmitted from the base station 110 to the UE 120. The CSI-RSs may be configured to be aperiodic (e.g., using DCI and/or the like). The second beam management procedure may include the base station 110 performing beam sweeping over one or more transmit beams. The one or more transmit beams may be a subset of all transmit beams associated with the base station 110 (e.g., determined based at least in part on measurements reported by the UE 120 in connection with the first beam management procedure). The base station 110 may transmit a CSI-RS using each transmit beam of the one or more transmit beams for beam management. The UE 120 may measure each CSI-RS using a single (e.g., a same) receive beam (e.g., determined based at least in part on measurements performed in connection with the first beam management procedure). The second beam management procedure may enable the base station 110 to select a best transmit beam based at least in part on measurements of the CSI-RSs (e.g., measured by the UE 120 using the single receive beam) reported by the UE 120.

As shown in FIG. 6, example 620 depicts a third beam management procedure (e.g., P3 CSI-RS beam management). The third beam management procedure may be referred to as a beam refinement procedure, a UE beam refinement procedure, a receive beam refinement procedure, and/or the like. As shown in FIG. 6 and example 620, one or more CSI-RSs may be configured to be transmitted from the base station 110 to the UE 120. The CSI-RSs may be configured to be aperiodic (e.g., using DCI and/or the like). The third beam management process may include the base station 110 transmitting the one or more CSI-RSs using a single transmit beam (e.g., determined based at least in part on measurements reported by the UE 120 in connection with the first beam management procedure and/or the second beam management procedure). To enable the UE 120 to perform receive beam sweeping, the base station may use a transmit beam to transmit (e.g., with repetitions) CSI-RS at multiple times within the same RS resource set so that UE 120 can sweep through one or more receive beams in multiple transmission instances. The one or more receive beams may be a subset of all receive beams associated with the UE 120 (e.g., determined based at least in part on measurements performed in connection with the first beam management procedure and/or the second beam management procedure). The third beam management procedure may enable the base station 110 and/or the UE 120 to select a best receive beam based at least in part on reported measurements received from the UE 120 (e.g., of the CSI-RS of the transmit beam using the one or more receive beams).

As indicated above, FIG. 6 is provided as an example of beam management procedures. Other examples of beam management procedures may differ from what is described with respect to FIG. 6. For example, the UE 120 and the base station 110 may perform the third beam management procedure before performing the second beam management procedure, the UE 120 and the base station 110 may perform a similar beam management procedure to select a UE transmit beam, and/or the like.

Figure 7:
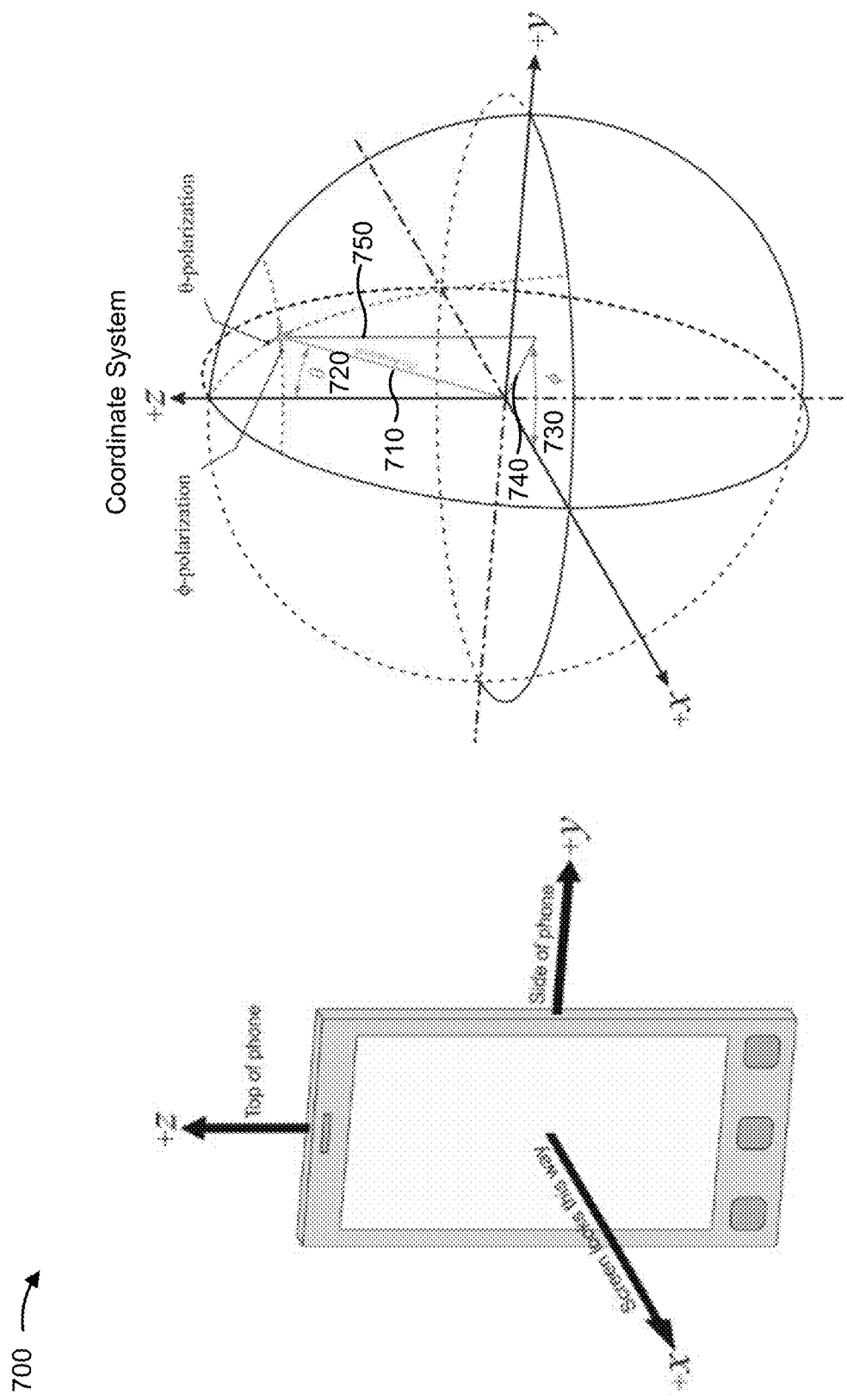
FIG. 7 is a diagram illustrating and example of a coordinate system for indicating spatial directions in relation to a UE, in accordance with various aspects of the present disclosure.

FIG. 7 is a diagram illustrating an example 700 of a coordinate system for indicating spatial directions in relation to a UE, in accordance with various aspects of the present disclosure.

As shown, an x-axis of the coordinate system may extend perpendicularly out of a front surface of the UE 120. A y-axis and a z-axis may be defined in relation to the x-axis, as shown, to form a three-dimensional Cartesian coordinate system, where the x-axis, the y-axis, and the z-axis are all mutually perpendicular to one another and intersect at an origin (e.g., the UE, a center of the UE, an approximate center of the UE, an antenna of the UE, an antenna element of the UE, an antenna array of the UE, and/or the like).

As shown, a line 710 extending in a direction (e.g., a spatial direction for beamforming) may be defined by an angle theta ($\theta$) and an angle phi ($\Phi$). As shown by reference number 720, the angle theta is defined as an angle between the z-axis and the line 710. As shown by reference number 730, an angle phi ($\Phi$) is defined as an angle between the x-axis and a line 740 that lies on a plane that includes (or that is parallel to) the x-axis and the y-axis. The line 740 intersects the origin (e.g., the x-axis, the y-axis, and the z-axis) and also interests a line 750 that is parallel to the z-axis, that is perpendicular to the plane that includes the x-axis and the y-axis, and that intersects the line 710.

FIG. 7 is provided as an example of a coordinate system for indicating spatial directions in relation to a UE. Other example coordinate systems may differ from what is described with respect to FIG. 7, and may be used in connection with the techniques and apparatuses described herein.

In a wireless network, a base station may configure a UE to measure and report channel condition values of beams so that the base station and/or the UE may perform one or more beam management procedures. For example, a UE may measure beams of a serving cell and may report the measurements to the base station according to a measurement configuration. Similarly, the UE may measure beams of one or more neighbor cells and may report the measurements to the base station according to a measurement configuration. The base station may receive the reported measurements from the UE and may perform one or more beam management procedures based at least in part on the reported measurements. For example, the base station may select a cell to add as an SCG (e.g., in a dual connectivity mode), may determine a best beam (or beam pair) for communications between the base station and the UE (e.g., a best base station transmit beam and/or a best UE receive beam), may select a target cell for a handover procedure, and/or the like. As used herein, a "beam" may refer to a single beam or a beam pair, depending on the context.

Some measurement configurations may result in poor beam management, such as sub-optimal beam selection. For example, a UE connected to a first cell (e.g., of a first base station, a first RAT, and/or the like) may be configured with a measurement configuration for a cell selection procedure (e.g., an inter-RAT cell selection procedure). The cell selection procedure may configure a measurement event (e.g., a B1 measurement event) for reporting measurement values of a second cell (e.g., of a second base station, of the first RAT, of a second RAT, and/or the like) to a base station associated with the first cell. The UE may detect and measure beams of the second cell using a wide beam (e.g., a beam that has not been refined, a beam that is not associated with a beamforming gain, a pseudo-omnidirectional beam, a beam formed using a single antenna element, and/or the like). The UE may determine a channel condition value of a beam of the second cell (e.g., using the wide beam) to determine whether the channel condition value of the beam of the second cell satisfies or triggers the measurement event for reporting measurement values of a second cell to the base station associated with the first cell. However, performing measurements using a wide beam may not provide sufficient beamforming gain to the channel condition value of the beam of the second cell to satisfy or trigger the measurement event for reporting measurement values of a second cell to the base station associated with the first cell, and/or the reported channel condition value may not be sufficient to trigger addition of the second cell as part of an SCG.

For example, a UE with poor antenna coverage, a UE that is a customer premises equipment (CPE), a UE that is a lower tier UE, and/or the like, may not materialize sufficient beamforming gain using a wide beam when measuring the beam of the second cell to satisfy or trigger the measurement event for reporting measurement values of the second cell. For example, near a cell edge of the second cell, the UE may determine, using the wide beam, a poor (or lower) channel condition value of the beam of the second cell than if the beam of the second cell were measured by the UE using a narrow beam. As a result, the UE may not report the channel condition value of the beam of the second cell to the base station associated with the first cell. In this case, the base station may not add the second cell as part of an SCG, even where a measurement of the beam of the second cell by the UE using a more refined or narrow beam would have resulted in a channel condition value that would have satisfied or triggered the measurement event for reporting measurement values of a second cell to the base station. Thus, the measurement configuration may result in lower throughput than otherwise could be achieved if the second cell were added as part of an SCG.

Some techniques and apparatuses described herein enable improved beam management, reduced battery consumption, improved network performance, and/or higher throughput. For example, a UE may modify channel condition values measured for a first set of beams (e.g., wider beams) to account for beamforming gain of a second set of beams (e.g., narrower beams) without actually measuring channel condition values for the second set of beams. In this way, the UE may conserve battery power and other UE resources (e.g., processing power, memory, and/or the like) by refraining from performing measurements using the second set of beams (e.g., which may have a larger search space than the first set of beams due to including more beams than the first set of beams) while improving network performance (e.g., via higher throughput, higher reliability, lower latency, and/or the like) by enabling a cell to be added to an SCG if a modified channel condition value satisfies a threshold even if a corresponding (unmodified) channel condition value, measured using the first set of beams, does not satisfy the threshold.

Furthermore, the base station may configure or otherwise be associated with a time constraint for the UE to report beam measurements (e.g., after transmission of reference signals associated with beam measurements, such as SSBs and/or CSI-RSs). The UE may be unable to satisfy this time constraint if the UE measures beam parameters using the second set of beams, which may include a greater number of beams than the first set of beams. Some techniques and apparatuses described herein enable the UE to satisfy such a time constraint by refraining from performing measurements using the second set of beams while improving network performance by enabling a cell to be added to an SCG as described above.

Figure 8:
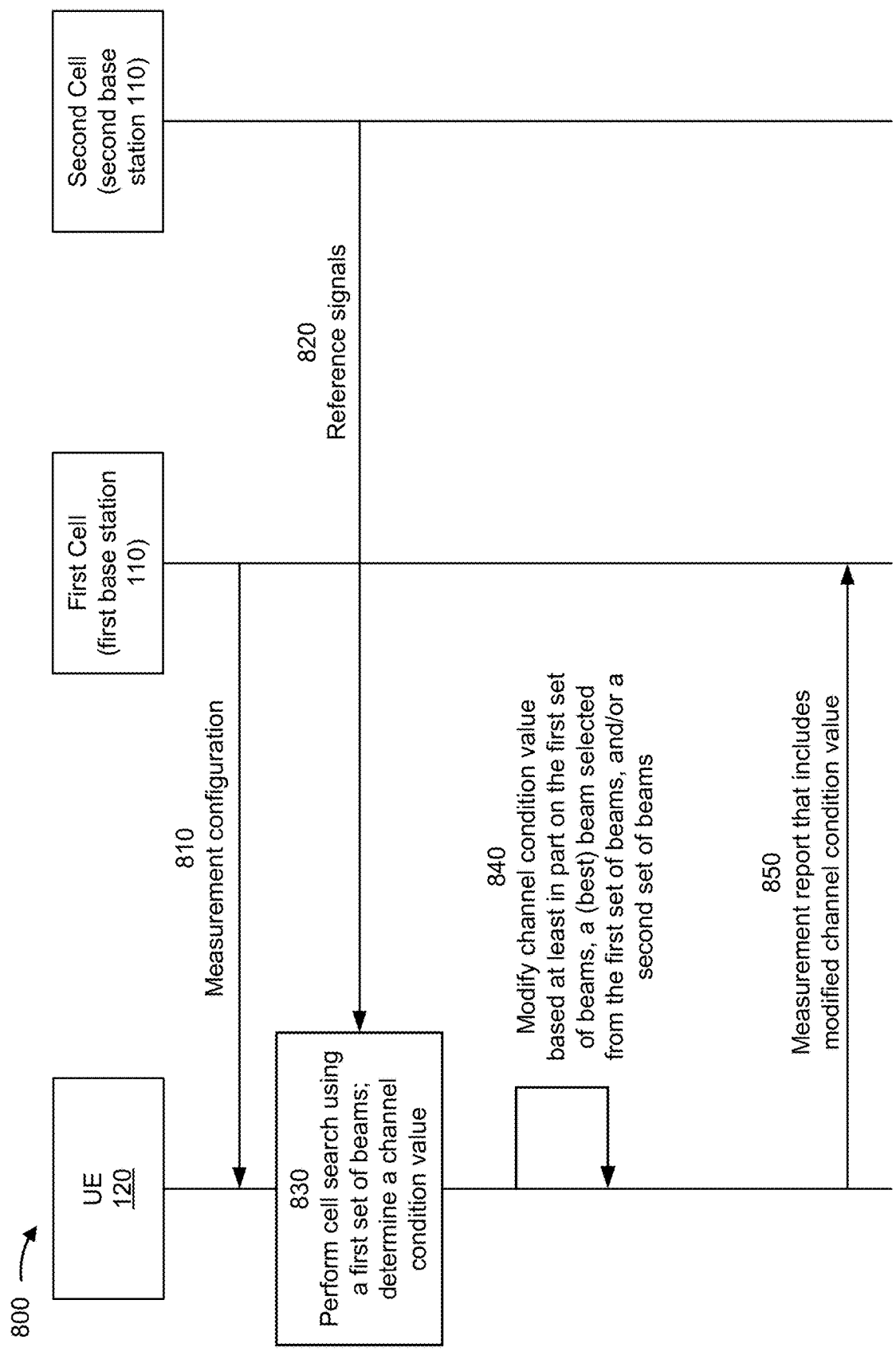
FIGS. 8-10 are diagrams illustrating examples associated with modifying values transmitted in a measurement report for beam management, in accordance with various aspects of the present disclosure.

FIG. 8 is a diagram illustrating an example 800 associated with modifying values transmitted in a measurement report for beam management, in accordance with various aspects of the present disclosure. In example 800, a UE 120 may establish a communication connection with a first cell (e.g., a primary cell (PCell)) of a first cell group (e.g., an MCG), associated with a first base station 110. A second cell, associated with a second base station 110, may be a candidate cell for dual connectivity with the first cell (e.g., may be a candidate to serve as a primary secondary cell (PSCell) of a second cell group (e.g., an SCG), a secondary cell (SCell) of an SCG, and/or the like). In some aspects, the first cell may be associated with a first RAT (e.g., an LTE RAT, a 4G RAT, and/or the like). The second cell may be associated with a second RAT (e.g., an NR RAT, a 5G RAT, and/or the like). In some aspects, the first RAT and the second RAT may be different RATs, such as in the case of ENDC or NEDC. Alternatively, the first RAT and the second RAT may be the same RAT, such as in the case of NRDC. In some aspects, there may multiple second cells that may be candidates for dual connectivity with the first cell in a similar manner as described herein.

As shown by reference number 810, the UE 120 may receive, from the first base station 110 of the first cell, a measurement configuration. In some aspects, the measurement configuration may be associated with an inter-RAT (IRAT) cell selection procedure. For example, the measurement configuration may be associated with a cell search procedure and/or a cell selection procedure for selecting a cell associated with the second RAT for dual connectivity with the first cell.

The measurement configuration may indicate a measurement event for reporting measurement values of cells associated with the second RAT to the first base station 110 (e.g., associated with the first RAT). The measurement event may be a B1 measurement event (e.g., for reporting IRAT neighbor cells) or another type of measurement event (e.g., for reporting intra-RAT neighbor cells). The measurement event may indicate a reporting threshold for reporting measurement values associated with cells of the second RAT. In some aspects, the reporting threshold may indicate a channel condition value (e.g., an RSRP value, a signal-to-noise ratio (SNR) value, a signal-to-interference-plus-noise ratio (SINR) value, and/or the like) that is a threshold channel condition value for reporting channel condition values associated with cells of the second RAT. That is, if the UE 120 measures a beam associated with the second RAT and determines that a channel condition value of the beam associated with the second RAT satisfies the reporting threshold, the UE 120 may report the channel condition value of the beam associated with the second RAT to the first base station 110 associated with the first RAT.

As shown by reference number 820, the second base station 110 may transmit reference signals, such as SSBs and/or CSI-RSs. The reference signals may be used for a cell search procedure, a beam management procedure, and/or the like. In some aspects, the reference signals may be used to detect whether a measurement report should be transmitted by the UE 120 to the first base station 110. The second base station 110 may transmit respective reference signals on different beams.

As shown by reference number 830, the UE 120 may perform a cell search (e.g., a cell search procedure) using a first set of beams (e.g., a first set of UE receive beams). For example, the UE 120 may measure one or more beams of the second cell by measuring the reference signals transmitted on the one or more beams by the second base station 110 according to the measurement configuration. In some aspects, the UE 120 may measure beams from one or more other cells associated with the second RAT. The UE 120 may determine a channel condition value (e.g., an RSRP value, an SNR value, a SINR value, and/or the like) for a beam of the second cell based at least in part on performing the cell search. For example, the UE 120 may measure multiple beams, and may determine a channel condition value for each measured beam. In some aspects, the channel condition value is a value measured by the UE 120 during the cell search and/or calculated by the UE 120 using one or more measurements obtained by the UE 120 during the cell search. In some aspects, the UE 120 may perform the cell search in association with adding a cell for dual connectivity, such as for establishing dual connectivity, for creating an SCG, for adding a cell to an existing SCG, and/or the like.

In some aspects, the beams included in the first set of beams are wide beams. A wide beam may be a beam with a large degree of coverage (e.g., a wide beam may have a beam width of at least 90 degrees). In some aspects, a wide beam may be an unrefined beam, a pseudo-omnidirectional beam, a Level 1 beam (that is, a 1-element beam, such as a beam formed using a single antenna element of the UE 120), and/or the like. The UE 120 may measure beams of the second cell using a set of wide beams to reduce an amount of time and an amount of resource consumption by the UE 120 associated with measuring beams of the second RAT because measuring beams of the second cell using refined or narrow beams may require a beam sweeping procedure which may increase the amount of time associated with measuring beams of the second RAT and may increase the resources used by the UE 120 to perform such measurements.

As shown by reference number 840, the UE 120 may modify a measured channel condition value for a beam of the second cell. In some aspects, the UE 120 may modify the channel condition value of the beam of the second cell using a beamforming gain value. The beamforming gain value may be a nominal value to indicate a beamforming gain that may be achieved through beamforming or refining the wide beam used by the UE 120 to measure one or more beams of the second cell and determine the channel condition value of the one or more beams of the second cell.

In some aspects, the UE 120 may modify the channel condition value based at least in part on the first set of beams used to perform the cell search, a beam selected from the first set of beams, and/or a second set of beams that is different from the first set of beams and that is included in a beamforming codebook associated with the UE 120. For example, the UE 120 may determine or calculate a beamforming gain value (sometimes referred to herein as a "nominal gain") using the first set of beams, a beam selected from the first set of beams, and/or the second set of beams, as described in more detail elsewhere herein (e.g., in connection with FIGS. 9 and 10). In some aspects, the UE 120 may modify the channel condition value by adding the beamforming gain value (e.g., the nominal gain) to the channel condition value or otherwise modifying the channel condition value using the beamforming gain value.

In some aspects, the beam selected from the first set of beams is a best beam from the first set of beams. For example, the beam selected from the first set of beams may be the strongest beam compared to other beams in the first set of beams, may be the strongest available beams compared to other beams in the first set of beams (e.g., in a scenario where one or more beams in the first set of beams is unavailable due to, for example, a maximum permissible exposure constraint), may be the beam with the best (e.g., highest, strongest) channel condition value as compared to other beams in the first set of beams, and/or the like.

The second set of beams may be different from the first set of beams. In some aspects, each beam included in the second set of beams may be different from every beam included in the first set of beams. The second set of beams may be included in a beamforming codebook of the UE 120 (e.g., the UE 120 may be capable of and/or configured to communicate using the second set of beams). In some aspects, the second set of beams is not used to perform the cell search. As one example, the first set of beam may be Level 1 beams that are formed using a single antenna element, and the second set of beams may be Level 2 beams that are formed using two antenna elements. As another example, the first set of beam may be Level 1 beams that are formed using a single antenna element, and the second set of beams may be Level 3 beams that are formed using four antenna elements. As another example, the first set of beam may be Level 2 beams that are formed using two antenna elements, and the second set of beams may be Level 3 beams that are formed using four antenna elements. In general, the first set of beams may be lower-level beams that are formed using fewer antenna elements than the second set of beams. Similarly, the second set of beams may be higher-level beams that are formed using more antenna elements than the first set of beams. In some aspects, a beam level may be associated with a particular beam width and/or a particular beamforming gain. For example, lower-level beams may be associated with wider beam widths and smaller beamforming gains, and higher-level beams may be associated with narrower beam widths and larger beamforming gains.

In some aspects, the second set of beams have a spatial relationship with the first set of beams and/or with the selected beam. For example, the second set of beams may be associated with a same antenna array as the selected beam. In this case, the same antenna array may be used to form the selected beam and to form the second set of beams. Additionally, or alternatively, the second set of beams may be child beams of the selected beam.

Two beams may have a parent-child relationship with one another. A parent beam may be associated with a lower level. A lower-level beam (e.g., a Level 1 beam) may have a wider beam width, may have a smaller beamforming gain, may be formed using a smaller number of antenna elements, and/or the like, as compared to a higher-level beam (e.g., a Level 2 beam). A child beam may be associated with a higher level than a parent beam of the child beam. A higher-level beam (e.g., a Level 2 beam) may have a narrower beam width, may have a larger beamforming gain, may be formed using a larger number of antenna elements, and/or the like, as compared to a lower-level beam (e.g., a Level 1 beam). In some aspects, a single parent beam may be associated with multiple child beams. In some aspects, a beamforming codebook of the UE 120 may indicate parent-child relationships between beams. The UE 120 may move from a parent beam to a child beam of the parent beam as part of a beam refinement procedure. For example, the UE 120 may perform measurements on child beams corresponding to a parent beam, or on parent beams corresponding to a child beam, as part of a beam refinement procedure.

In some aspects, the UE 120 may modify the channel condition value by adding the beamforming gain value. The modified channel condition value may enable the UE 120 to estimate a channel condition value of a beam without actually measuring the beam, thereby reducing measurement and/or reporting latency and conserving resources (e.g., processing resources, memory resources, and/or battery power) by measuring the second cell using a wide beam rather than one or more narrow beams. Example techniques for modifying the channel condition value are described below in connection with FIGS. 9 and 10.

In some aspects, the modification of the channel condition value may depend on one or more factors associated with the UE 120. In some aspects, these factors may impact the beams included in the first set of beams, the second set of beams, the beam selected from the first set of beams, a third set of beams (described elsewhere herein), and/or a function used to determine a nominal gain (described elsewhere herein), among other examples. Additional details are described below in connection with FIG. 9.

As shown by reference number 850, the UE 120 may transmit a measurement report, to the first base station 110 of the first cell, that includes the modified channel condition value. Additionally, or alternatively, the UE 120 may transmit the measurement report based at least in part on a determination that a measurement reporting threshold (e.g., indicated in the measurement configuration) is satisfied by the modified channel condition value. For example, a measured channel condition value may not satisfy the measurement reporting threshold, but when the channel condition value is modified (e.g., by adding a beamforming gain value), then the modified channel condition value may satisfy the measurement reporting threshold. Thus, the UE 120 may transmit a measurement report, despite an actual measurement not satisfying the measurement reporting threshold, by accounting for beamforming gain that may result in a better channel condition than a channel condition indicated by the actual measurement. This beamforming gain may be estimated by the UE 120 as described above to conserve computing resources and reduce latency as compared to performing actual measurements using narrower beams (e.g., using the second set of beams).

In some aspects, the measurement report may include the modified channel condition value. The base station 110 may use the modified channel condition value to determine whether to add a cell (e.g., to form an SCG, to add a cell to an existing SCG, and/or the like), to select a cell to be added, to perform handover, and/or the like. For example, the first base station 110 of the first cell may receive the measurement report that includes the modified channel condition value. The first base station 110 may transmit an indication to the UE 120 to add the second cell as a PSCell or an SCell for dual connectivity with the first cell.

In some aspects, the UE 120 may perform a beam refinement procedure associated with adding the second cell. As a result, the UE 120 may materialize the beamforming gain value by performing the beam refinement procedure when adding the second cell as the PSCell. Thus, after adding the second cell as the PSCell, the UE 120 may operate in a dual connectivity mode with the first cell as a PCell of an MCG and the second cell as a PSCell of an SCG, or may add a cell (e.g., as an SCell) to an existing SCG that is part of dual connectivity. The dual connectivity mode may improve network performance and increase throughput of the UE 120.

As indicated above, FIG. 8 is provided as an example. Other examples may differ from what is described with respect to FIG. 8.

Figure 9:
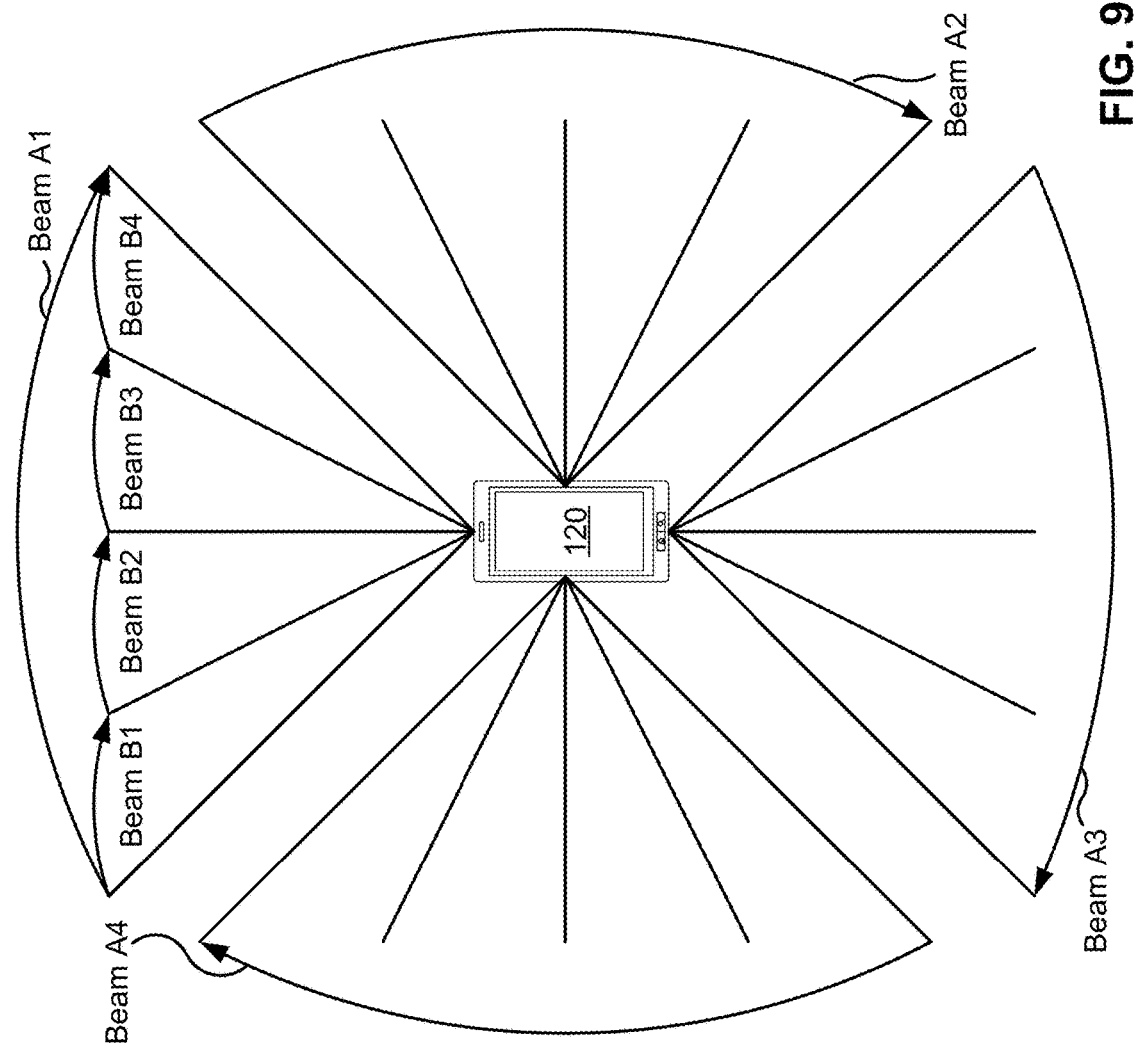

FIG. 9 is a diagram illustrating an example 900 associated with modifying values transmitted in a measurement report for beam management, in accordance with various aspects of the present disclosure.

As shown by reference number 910, a first set of beams used to perform a cell search (as described above in connection with FIG. 8) includes beams A1, A2, A3, and A4. The first set of beams may be referred to herein as "Set A." A UE 120 may perform a cell search using the first set of beams, and may select a beam from the first set of beams. For example, the UE 120 may select a strongest beam from the first set of beams, shown as beam A1 in FIG. 9. The UE 120 may then identify a second set of beams that were not used for the cell search, that are included in a beamforming codebook of the UE 120, and that are child beams of (or beams of a higher level than) beam A1. The second set of beams is shown in FIG. 9 as beams B1, B2, B3, and B4. The second set of beams may be referred to herein as "Set B."

In example 900, beams A1, A2, A3, and A4 may be Level 1 beams that are each beamformed using a single antenna element, and beams B1, B2, B3, and B4 may be Level 3 beams that are each beamformed using four antenna elements. In other examples, the second set of beams may be Level 2 beams. As shown, the beams B1, B2, B3, and B4 may have a narrower beam width than beam A1. In some aspects, the beams B1, B2, B3, and B4 are beamformed using a same antenna array (e.g., a set of antenna elements) as beam A1.

As further shown in FIG. 9, a third set of beams includes beams A1 and A2. The third set of beams may have a spatial relationship with the first set of beams. For example, the third set of beams may include beams of the same level as the first set of beams and/or the selected beam (e.g., beams that are beamformed using a same number of antenna elements as the first set of beams and/or the selected beam). Additionally, or alternatively, the third set of beams may include beams that are beamformed using a same antenna array as beam A1. In some aspects, the third set of beams is a subset of the first set of beams. The third set of beams may be referred to herein as "Set C."

As shown by reference number 920, the UE 120 may identify a gain matrix for a beam. A gain matrix may include a set of gain parameters (e.g., RSRP parameters, SNR parameters, SINR parameters, and/or the like) determined for a corresponding set of spatial directions from the UE 120. A spatial direction may be defined by a first angle theta ($\theta$) from the UE 120 and a second angle phi ($\Phi$) from the UE 120, as described above in connection with FIG. 7. However, other definitions of and/or coordinates for a spatial direction may be used for the gain matrix. As shown, the UE 120 may identify a gain parameters for each spatial direction of multiple spatial directions. In some aspects, the gain matrix and/or the gain parameters may be stored in memory of the UE 120.

As shown by reference number 930, the UE 120 may identify a first maximum gain matrix (shown as Max Gain Matrix 1) for the third set of beams (Set C). The first maximum gain matrix may include maximum gain parameters, among the beams included in the third set of beams, for each direction ($\theta$, $\Phi$). For example, for a particular direction ($\theta$, $\Phi$), the UE 120 may identify a first gain parameter for a first beam (e.g., beam A1), and may identify a second gain parameter for a second beam (e.g., beam A2). The larger value (e.g., a maximum gain parameter) of the first gain parameter and the second gain parameter may be included in the first maximum gain matrix for the particular direction ($\theta$, $\Phi$). The UE 120 may perform a similar comparison for each direction included in the gain matrix to form the first maximum gain matrix.

As further shown, the UE 120 may identify a second maximum gain matrix (shown as Max Gain Matrix 2) for the second set of beams (Set B). The second maximum gain matrix may include maximum gain parameters, among the beams included in the second set of beams, for each direction ($\theta$, $\Phi$). For example, for a particular direction ($\theta$, $\Phi$), the UE 120 may identify a first gain parameter for a first beam (e.g., beam B1), may identify a second gain parameter for a second beam (e.g., beam B2), may identify a second gain parameter for a third beam (e.g., beam B3), and may identify a second gain parameter for a fourth beam (e.g., beam B4). The largest value (e.g., a maximum gain parameter) of the first gain parameter, the second gain parameter, the third gain parameter, and the fourth gain parameter may be included in the second maximum gain matrix for the particular direction ($\theta$, $\Phi$). The UE 120 may perform a similar comparison for each direction included in the gain matrix to form the second maximum gain matrix.

As further shown, the UE 120 may calculate a potential gain matrix as a difference between the first maximum gain matrix and the second maximum gain matrix. For example, for a particular direction ($\theta$, $\Phi$), the UE 120 may subtract the gain parameter for that direction included in the first maximum gain matrix (for Set C) from the gain parameter for that direction included in the second maximum gain matrix (for Set B), and may store the resulting value in the potential gain matrix for the particular direction. The UE 120 may perform a similar calculation for each direction included in the gain matrix to form the potential gain matrix.

As further shown, the UE 120 may calculate a nominal gain based at least in part on the potential gain matrix. The nominal gain is sometimes referred to herein as a beamforming gain. The UE 120 may calculate the nominal gain by performing a mathematical function on the potential gain matrix to transform the potential gain matrix (e.g., a multidimensional matrix, such as a two-dimensional matrix) into a single value (rather than multiple values included in a matrix. This transformation may reduce signaling overhead. In some aspects, the UE 120 may calculate the nominal gain as the average (e.g., the mean, the median, the mode, and/or the like) of all of the gain parameters or a subset of the gain parameters included in the potential gain matrix. Additionally, or alternatively, the function may be based at least in part on a specific quantile of gain parameter values included in the potential gain matrix (e.g., a 10% quantile, a 25% quantile, a 50% quantile, a 75% quantile, or an 80% quantile, among other examples).

As further shown, the UE 120 may combine the nominal gain and the channel condition value to form the modified channel condition value. For example, the UE 120 may sum the nominal gain and the measured channel condition value to form the modified channel condition value. The UE 120 may use the modified channel condition value to determine whether to transmit a measurement report and/or may include the modified channel condition value in a measurement report, as described above in connection with FIG. 8.

In some aspects, the modification of the channel condition value may depend on one or more factors associated with the UE 120. In some aspects, these factors may impact the beams included in the first set of beams, the second set of beams, the beam selected from the first set of beams, the third set of beams, and/or a function used to determine the nominal gain, among other examples. For example, a thermal mitigation factor may impact a maximum allowable beam level (e.g., a maximum number of antenna elements that are permitted to be used for beamforming). The second set of beams may include the highest level of beams (e.g., the narrowest beams), that the UE 120 is capable of using and/or configured to use according to a beamforming codebook of the UE 120, that are permitted according to the thermal mitigation factor (e.g., to prevent the UE 120 from overheating). In some aspects, the thermal mitigation factor may depend on an environmental temperature of the UE 120, an operating temperature of the UE 120, and/or the like.

Additionally, or alternatively, an estimated angle of a signal received by the UE 120 from a base station 110 (e.g., an angle of arrival) or a signal transmitted by the UE 120 to the base station 110 (e.g., an angle of departure) may impact the modified channel condition value. For example, the UE 120 may limit the second set of beams based at least in part on the estimated angle (e.g., to include beams with a spatial direction within a threshold of the estimated angle) and/or may limit values of one or more gain matrices based at least in part on the estimated arrival (e.g., to only consider spatial directions, defined by theta and phi, that are within a threshold of the estimate angle). For example, the UE 120 may exclude one or more values of the first maximum gain matrix, the second maximum gain matrix, and/or the potential gain matrix when calculating a nominal gain.

Additionally, or alternatively, a geographic location of the UE 120 may impact the first set of beams, the second set of beams, and/or the beam selected by the UE 120. Additionally, or alternatively, a throughput requirement associated with the UE 120 (e.g., for one or more applications executing on the UE 120, for downlink communications, for uplink communications, and/or the like) may impact the modification of the channel condition value. Additionally, or alternatively, a remaining battery charge and/or a battery charging status (e.g., whether the UE 120 is being charged, a rate at which the UE 120 is being charged, and/or the like) may impact the modification of the channel condition value. For example, the UE 120 may use a different function to derive the nominal gain from the potential gain matrix based at least in part on the geographic location of the UE 120, the throughput requirement, the remaining battery charge, and/or the battery charging status. For example, the UE 120 may use a function that results in a higher nominal gain (e.g., by using a higher quantile) when the UE 120 has a higher throughput requirement, is closer to the base station 110, has a greater remaining battery charge, is being charged, and/or the like, and the UE 120 may use a function that results in a lower nominal gain (e.g., by using a lower quantile) when the UE 120 has a lower throughput requirement, is farther from the base station 110, has a lower remaining battery charge, is not being charged, and/or the like.

By modifying a channel condition value measured for a first set of beams (e.g., wider beams) to account for beamforming gain of a second set of beams (e.g., narrower beams) without actually measuring channel condition values for the second set of beams, the UE 120 may conserve battery power and other UE resources while still accounting for the beamforming gain. As a result, the UE 120 may cause the base station 110 to add a cell for communication with the UE 120 by accounting for the beamforming gain, thereby improving network performance (e.g., via higher throughput, higher reliability, lower latency, and/or the like). Furthermore, the UE 120 may be enabled to satisfy a time constraint by refraining from performing measurements using the second set of beams while improving network performance by enabling a cell to be added to an SCG, as described above.

As indicated above, FIG. 9 is provided as an example. Other examples may differ from what is described with respect to FIG. 9.

Figure 10:
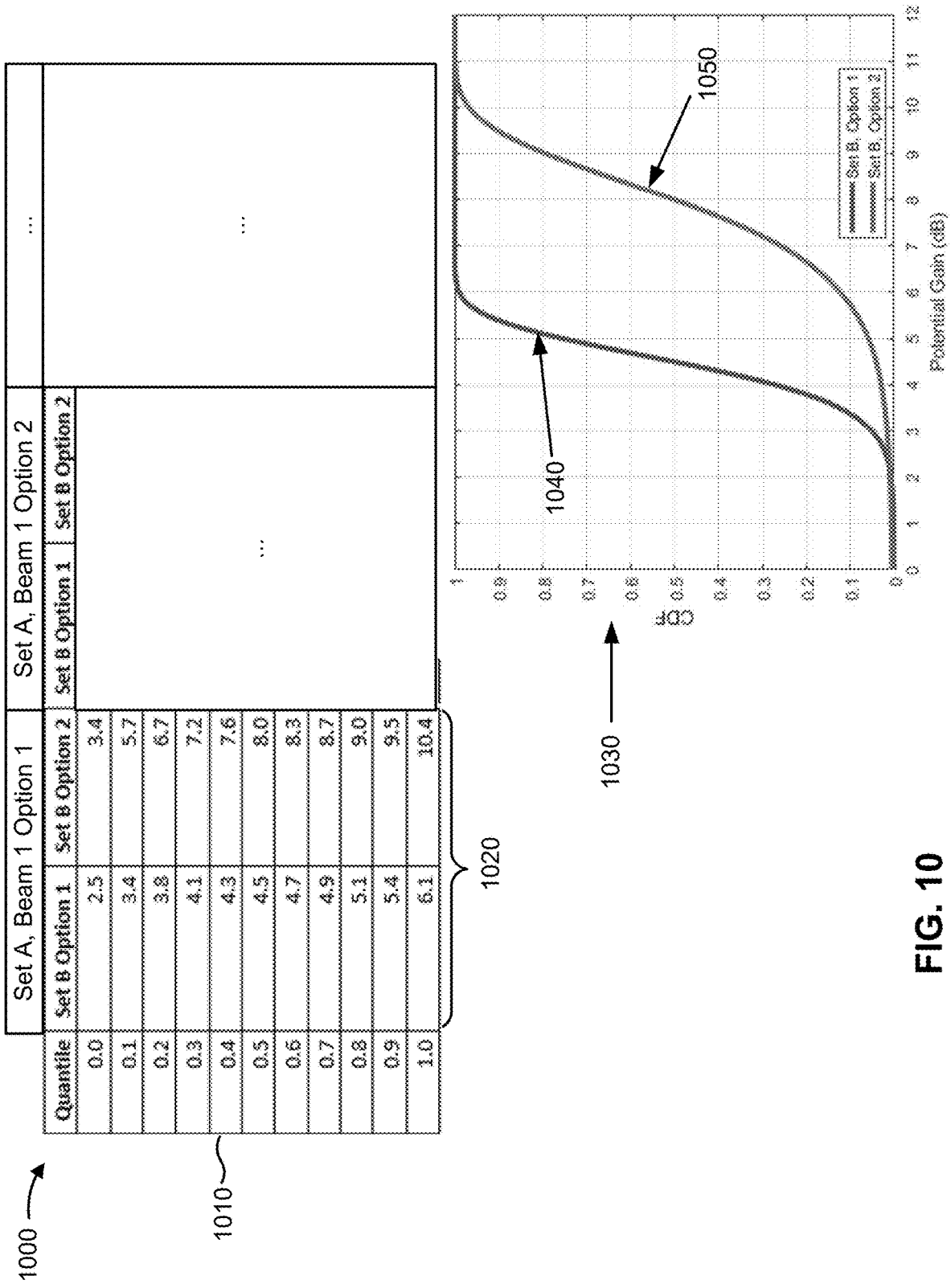

FIG. 10 is a diagram illustrating an example 1000 associated with modifying values transmitted in a measurement report for beam management, in accordance with various aspects of the present disclosure.

As shown by reference number 1010, the UE 120 may store information that indicates gain parameters (e.g., nominal gains) for a given first set of beams (Set A), a given selected beam from the first set of beams (Beam 1), and a given second set of beams (Set B). As shown by reference number 1020, for a particular combination of beams included in Set A and a particular Beam 1 (shown as Set A, Beam 1 Option 1), the UE 120 may store gain parameter values associated with Set A and Beam 1 for a first combination of beams included in the second set of beams (shown as Set B Option 1), may store gain parameter values associated with Set A and another particular Beam 1 for a second combination of beams included in the second set of beams (shown as Set B Option 2), and so on.

During operation of the UE 120 (e.g., in association with performing a cell search), the UE 120 may determine Set A (e.g., the beams to be used for a cell search), Beam 1 (e.g., the best beam included in Set A as indicated by the cell search), and Set B (e.g., beams not used for the cell search, that are included in a codebook of the UE 120, and that have a spatial relationship with Set A and/or Beam 1, as described elsewhere herein). The UE 120 may perform a lookup operation (e.g., in a data structure or table, as shown) to identify a set of gain parameter values associated with the determined Set A, Beam 1, and Set B. As shown, the set of gain parameter values may correspond to a set of quantile values. The UE 120 may select a gain parameter value to be applied when modifying the channel condition value (e.g., a nominal gain to be added to the channel condition value) based at least in part on a quantile value selected by and/or configured for the UE 120.

Graph 1030 shows an example of a gain increase over a Level 1 (L1) beam resulting from using a Level 2 (L2) or a Level 3 (L3) beam rather than the Level 1 beam for a particular combination of Set A and Beam 1. Reference number 1040 shows the beamforming gain resulting from using a first combination of beams for Set B (e.g., Set B Option 1), which are Level 2 beams, as compared to using a Level 1 beam. Reference number 1050 shown the beamforming gain resulting from using a second combination of beams for Set B (e.g., Set B Option 2), which are Level 3 beams, as compared to using a Level 1 beam. The beamforming gain (e.g., nominal gain or potential gain) is shown on the x-axis, and the y-axis shows the gain for different quantiles. A quantile value may indicate a percentage of a sphere around the UE 120 for which the actual gain is less than a nominal gain corresponding to the quantile value. For example, the combination of Set A, Beam 1 Option 1, and Set B Option 1 is associated with a quantile value of 0.1 (10%) and a corresponding gain of 3.4, which indicates that 10% of the sphere around the UE 120 has a gain less than 3.4 (or less than or equal to 3.4) for Set A, Beam 1 Option 1, and Set B Option 1 (e.g., as compared to a reference beam, such as a Level 1 beam), and that 90% of the sphere around the UE 120 has a gain greater than 3.4 (or greater than or equal to 3.4) for Set A, Beam 1 Option 1, and Set B Option 1.

The UE 120 may use a quantile value to control an output (e.g., a nominal gain to be added to a channel condition value) for a particular Set A, Beam 1, and Set B. In some aspects, the UE 120 may select a quantile value based at least in part one or more factors described elsewhere herein, such as thermal mitigation, geographic location, an estimated angle of a signal received by the UE 120 or transmitted by the UE 120, a throughput requirement associated with the UE 120, a remaining battery charge of the UE 120, or a battery charging status of the UE 120. As shown, in some aspects, selecting a higher quantile (e.g., closer to 1) for parametric control of the nominal gain results in selection of a higher nominal gain, while selecting a lower quantile (e.g., closer to 0) for parametric control of the nominal gain results in selection of a lower nominal gain.

A UE 120 may select a higher quantile to be more aggressive when attempting to add a cell (e.g., for an SCG) for increased throughput at the cost of potentially wasting UE resources and network resources (e.g., when the actual beamforming gain is lower than the selected nominal gain). A UE 120 may select a lower quantile to be more conservative when attempting to add a cell (e.g., for an SCG) to conserve UE resources and network resources at the cost of potentially not adding a cell when the cell could have been added if the UE 120 had been more aggressive when attempting to add the cell (e.g., when the actual beamforming gain is higher than the selected nominal gain).

As indicated above, FIG. 10 is provided as an example. Other examples may differ from what is described with respect to FIG. 10.

Figure 11:
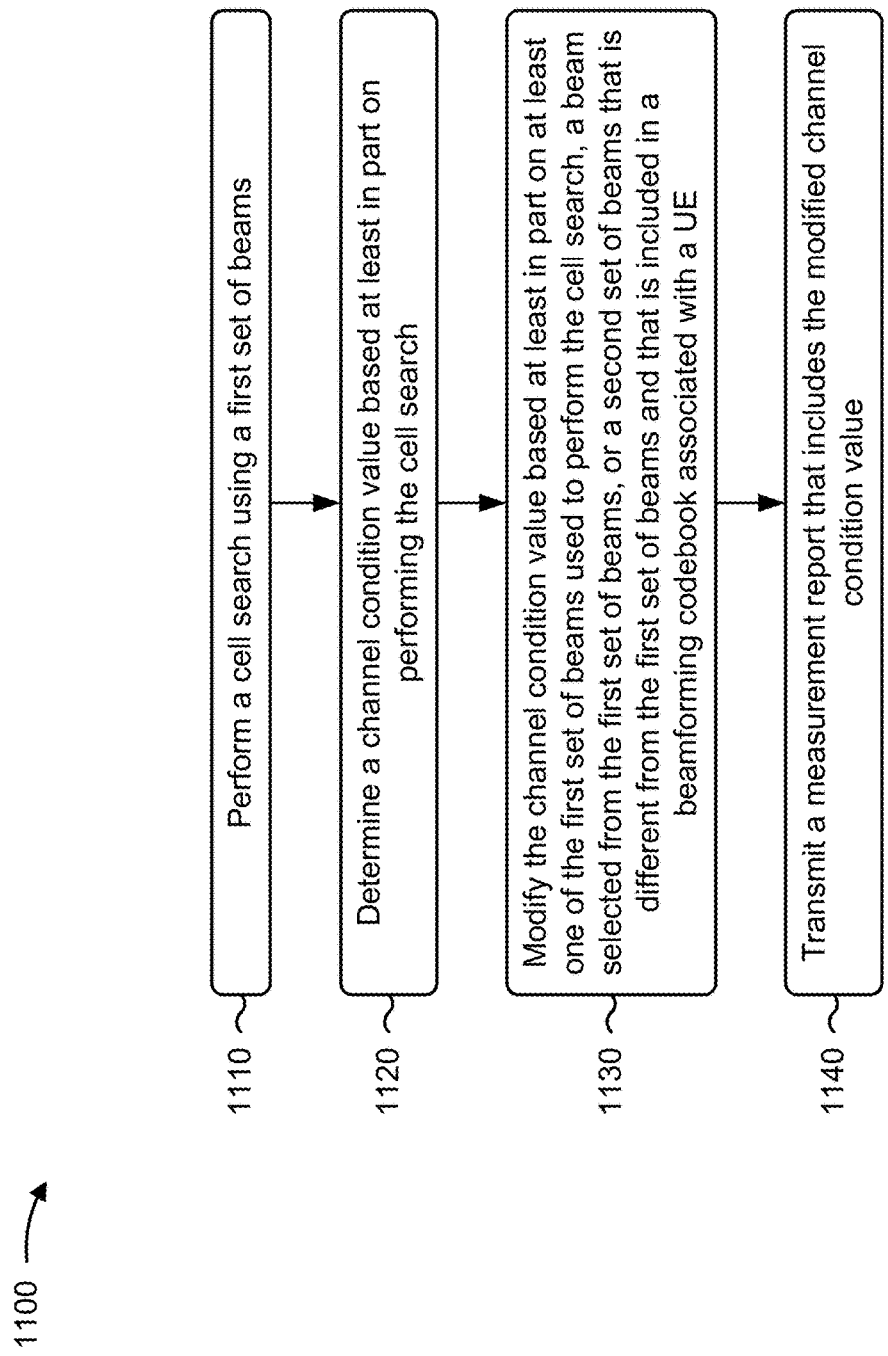
FIG. 11 is a diagram illustrating an example process associated with modifying values transmitted in a measurement report for beam management, in accordance with various aspects of the present disclosure.

FIG. 11 is a diagram illustrating an example process 1100 performed, for example, by a UE, in accordance with various aspects of the present disclosure. Example process 1100 is an example where the UE (e.g., UE 120) performs operations associated with modifying values transmitted in a measurement report for beam management.

As shown in FIG. 11, process 1100 includes performing a cell search using a first set of beams (block 1110). For example, the UE (e.g., using performing component 1208 of FIG. 12 may perform a cell search using a first set of beams, as described above.

As further shown in FIG. 11, process 1100 includes determining a channel condition value based at least in part on performing the cell search (block 1120). For example, the UE (e.g., using determination component 1210 of FIG. 12) may determine a channel condition value based at least in part on performing the cell search, as described above.

As further shown in FIG. 11, process 1100 includes modifying the channel condition value based at least in part on at least one of: the first set of beams used to perform the cell search, a beam selected from the first set of beams, or a second set of beams that is different from the first set of beams and that is included in a beamforming codebook associated with the UE (block 1130). The UE (e.g., using modification component 1212 of FIG. 12) modifies the channel condition value based at least in part on at least one of: the first set of beams used to perform the cell search, a beam selected from the first set of beams, or a second set of beams that is different from the first set of beams and that is included in a beamforming codebook associated with the UE, as described above.

As further shown in FIG. 11, process 1100 includes transmitting a measurement report that includes the modified channel condition value (block 1140). For example, the UE (e.g., using transmission component 1204 of FIG. 12) may transmit a measurement report that includes the modified channel condition value, as described above.

Process 1100 may include additional aspects, such as any single aspect or any combination of aspects described below and/or in connection with one or more other processes described elsewhere herein.

In a first aspect, the second set of beams is not used to perform the cell search.

In a second aspect, alone or in combination with the first aspect, the cell search is performed in association with adding a cell for dual connectivity.

In a third aspect, alone or in combination with one or more of the first and second aspects, the channel condition value is modified based at least in part on at least two of the first set of beams, the selected beam, or the second set of beams.

In a fourth aspect, alone or in combination with one or more of the first through third aspects, the channel condition value is modified based at least in part on the first set of beams, the selected beam, and the second set of beams.

In a fifth aspect, alone or in combination with one or more of the first through fourth aspects, the selected beam is a strongest beam measured in the first set of beams based at least in part on performing the cell search.

In a sixth aspect, alone or in combination with one or more of the first through fifth aspects, the second set of beams have a spatial relationship with the selected beam.

In a seventh aspect, alone or in combination with one or more of the first through sixth aspects, the channel condition value is modified further based at least in part on one or more gain parameters calculated for the second set of beams.

In an eighth aspect, alone or in combination with one or more of the first through seventh aspects, each of the one or more gain parameters corresponds to a maximum gain associated with the second set of beams in a respective direction.

In a ninth aspect, alone or in combination with one or more of the first through eighth aspects, the channel condition value is modified further based at least in part on a third set of beams that have a spatial relationship with the selected beam.

In a tenth aspect, alone or in combination with one or more of the first through ninth aspects, the channel condition value is modified further based at least in part on one or more gain parameters calculated for the third set of beams.

In an eleventh aspect, alone or in combination with one or more of the first through tenth aspects, each of the one or more gain parameters corresponds to a maximum gain associated with the third set of beams in a respective direction.

In a twelfth aspect, alone or in combination with one or more of the first through eleventh aspects, modifying the channel condition value further comprises identifying (e.g., using identification component 1214 of FIG. 12) a first gain matrix for a third set of beams that is associated with a same antenna array as the selected beam and uses a same number of antenna elements as the first set of beams, identifying (e.g., using identification component 1214 of FIG. 12) a second gain matrix for the second set of beams, wherein the second set of beams is associated with a same antenna array as the selected beam and uses more antenna elements than the first set of beams, calculating (e.g., using calculation component 1216 of FIG. 12) a potential gain matrix as a difference between the first gain matrix and the second gain matrix, calculating (e.g., using calculation component 1216 of FIG. 12) a nominal gain based at least in part on the potential gain matrix, and combining (e.g., using combining component 1218 of FIG. 12) the nominal gain and the channel condition value to form the modified channel condition value.

In a thirteenth aspect, alone or in combination with one or more of the first through twelfth aspects, the first set of beams use a single antenna element, and the second set of beams use multiple antenna elements.

In a fourteenth aspect, alone or in combination with one or more of the first through thirteenth aspects, the channel condition value is modified further based at least in part on at least one of a thermal mitigation factor, a geographic location of the UE, an estimated angle of a signal received by the UE or transmitted by the UE, a throughput requirement associated with the UE, a remaining battery charge of the UE, or a battery charging status of the UE.

Although FIG. 11 shows example blocks of process 1100, in some aspects, process 1100 may include additional blocks, fewer blocks, different blocks, or differently arranged blocks than those depicted in FIG. 11. Additionally, or alternatively, two or more of the blocks of process 1100 may be performed in parallel.

Figure 12:
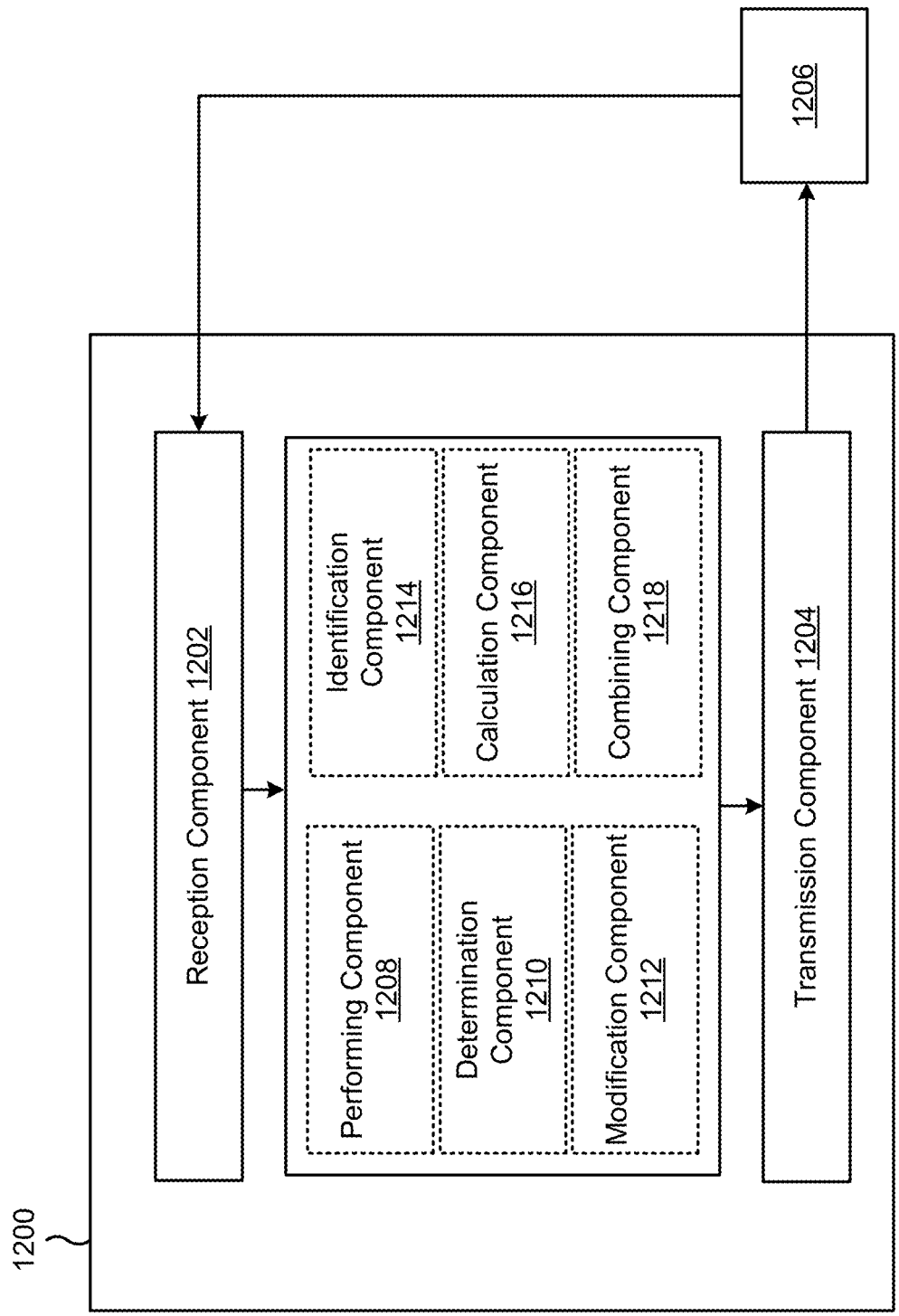
FIG. 12 is a block diagram of an example apparatus for wireless communication, in accordance with various aspects of the present disclosure.

FIG. 12 is a block diagram of an example apparatus 1200 for wireless communication. The apparatus 1200 may be a UE, or a UE may include the apparatus 1200. In some aspects, the apparatus 1200 includes a reception component 1202 and a transmission component 1204, which may be in communication with one another (for example, via one or more buses and/or one or more other components). As shown, the apparatus 1200 may communicate with another apparatus 1206 (such as a UE, a base station, or another wireless communication device) using the reception component 1202 and the transmission component 1204. As further shown, the apparatus 1200 may include one or more of a performing component 1208, a determination component 1210, a modification component 1212, an identification component 1214, a calculation component 1216, and/or a combining component 1218, among other examples.

In some aspects, the apparatus 1200 may be configured to perform one or more operations described herein in connection with FIGS. 8-10. Additionally or alternatively, the apparatus 1200 may be configured to perform one or more processes described herein, such as process 1100 of FIG. 11. In some aspects, the apparatus 1200 and/or one or more components shown in FIG. 12 may include one or more components of the UE described above in connection with FIG. 2. Additionally, or alternatively, one or more components shown in FIG. 12 may be implemented within one or more components described above in connection with FIG. 2. Additionally or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1202 may receive communications, such as reference signals, control information, data communications, or a combination thereof, from the apparatus 1206. The reception component 1202 may provide received communications to one or more other components of the apparatus 1200. In some aspects, the reception component 1202 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1206. In some aspects, the reception component 1202 may include one or more antennas, a demodulator, a MIMO detector, a receive processor, a controller/processor, a memory, or a combination thereof, of the UE described above in connection with FIG. 2.

The transmission component 1204 may transmit communications, such as reference signals, control information, data communications, or a combination thereof, to the apparatus 1206. In some aspects, one or more other components of the apparatus 1206 may generate communications and may provide the generated communications to the transmission component 1204 for transmission to the apparatus 1206. In some aspects, the transmission component 1204 may perform signal processing on the generated communications (such as filtering, amplification, modulation, digital-to-analog conversion, multiplexing, interleaving, mapping, or encoding, among other examples), and may transmit the processed signals to the apparatus 1206. In some aspects, the transmission component 1204 may include one or more antennas, a modulator, a transmit MIMO processor, a transmit processor, a controller/processor, a memory, or a combination thereof, of the UE described above in connection with FIG. 2. In some aspects, the transmission component 1204 may be collocated with the reception component 1202 in a transceiver.

The performing component 1208 may perform a cell search using a first set of beams. In some aspects, the performing component 1208 may include one or more antennas, a demodulator, a MIMO detector, a receive processor, a controller/processor, a memory, or a combination thereof, of the UE described above in connection with FIG. 2. The determination component 1210 may determine a channel condition value based at least in part on performing the cell search. In some aspects, the determination component 1210 may include one or more antennas, a demodulator, a MIMO detector, a receive processor, a controller/processor, a memory, or a combination thereof, of the UE described above in connection with FIG. 2. The modification component 1212 may modify the channel condition value based at least in part on at least one of the first set of beams used to perform the cell search, a beam selected from the first set of beams, or a second set of beams that is different from the first set of beams and that is included in a beamforming codebook associated with the UE. In some aspects, the modification component 1212 may include a transmit processor, a controller/processor, a memory, or a combination thereof, of the UE described above in connection with FIG. 2. The transmission component 1204 may transmit a measurement report that includes the modified channel condition value.

The identification component 1214 may identify a first gain matrix for a third set of beams that is associated with a same antenna array as the selected beam and uses a same number of antenna elements as the first set of beams. In some aspects, the identification component 1214 may include a controller/processor, a memory, or a combination thereof, of the UE described above in connection with FIG. 2. The identification component 1214 may identify a second gain matrix for the second set of beams, wherein the second set of beams is associated with a same antenna array as the selected beam and uses more antenna elements than the first set of beams. The calculation component 1216 may calculate a potential gain matrix as a difference between the first gain matrix and the second gain matrix. In some aspects, the calculation component 1216 may include a controller/processor, a memory, or a combination thereof, of the UE described above in connection with FIG. 2. The calculation component 1216 may calculate a nominal gain based at least in part on the potential gain matrix. The combining component 1218 may combine the nominal gain and the channel condition value to form the modified channel condition value. In some aspects, the calculation component 1216 may include a transmit processor, a controller/processor, a memory, or a combination thereof, of the UE described above in connection with FIG. 2.

The number and arrangement of components shown in FIG. 12 are provided as an example. In practice, there may be additional components, fewer components, different components, or differently arranged components than those shown in FIG. 12. Furthermore, two or more components shown in FIG. 12 may be implemented within a single component, or a single component shown in FIG. 12 may be implemented as multiple, distributed components. Additionally or alternatively, a set of (one or more) components shown in FIG. 12 may perform one or more functions described as being performed by another set of components shown in FIG. 12.

Figure 13:
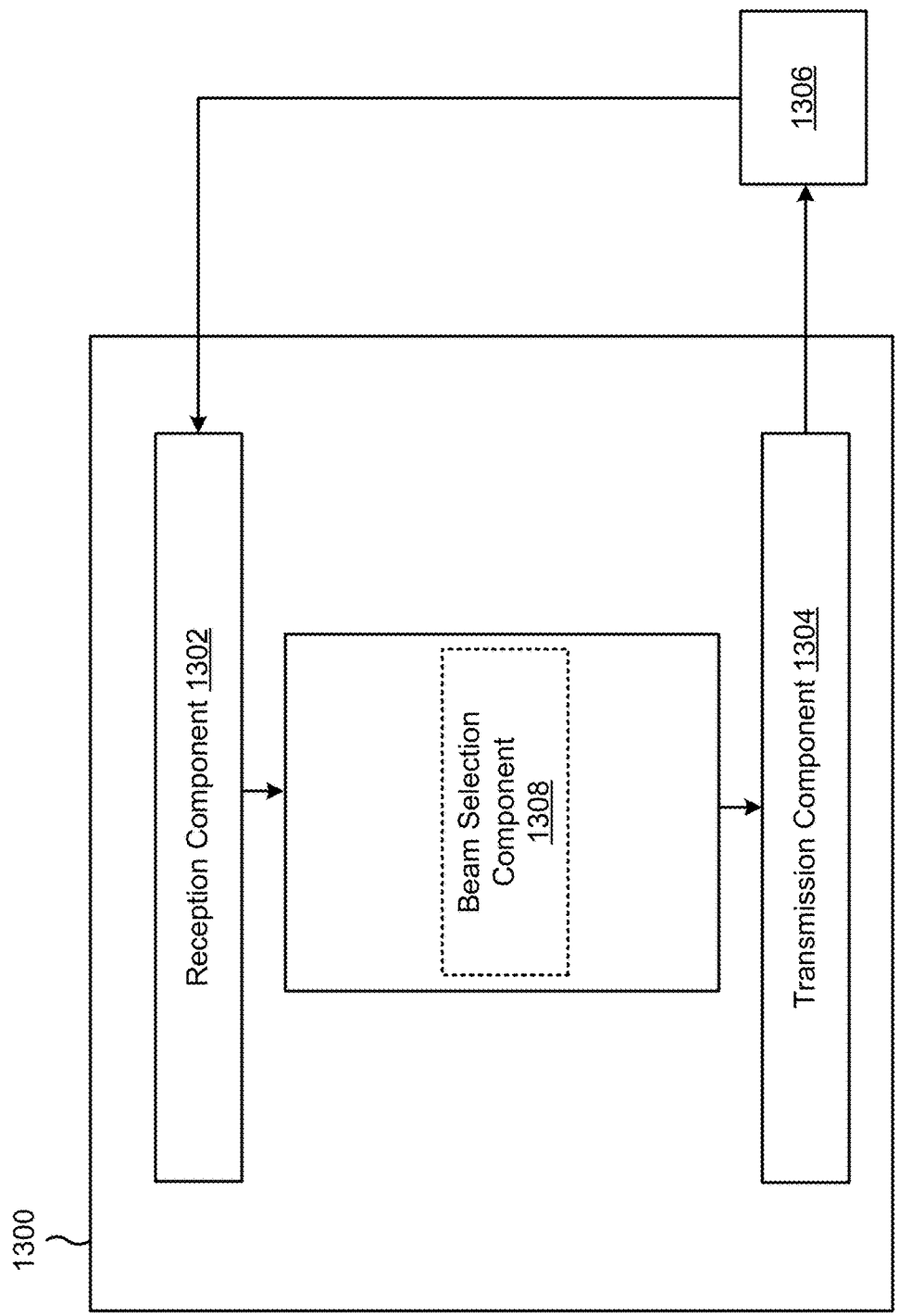
FIG. 13 is a block diagram of another example apparatus for wireless communication, in accordance with various aspects of the present disclosure.

FIG. 13 is a block diagram of an example apparatus 1300 for wireless communication. The apparatus 1300 may be a base station, or a base station may include the apparatus 1300. In some aspects, the apparatus 1300 includes a reception component 1302 and a transmission component 1304, which may be in communication with one another (for example, via one or more buses and/or one or more other components). As shown, the apparatus 1300 may communicate with another apparatus 1306 (such as a UE, a base station, or another wireless communication device) using the reception component 1302 and the transmission component 1304. As further shown, the apparatus 1300 may include a beam selection component 1308.

In some aspects, the apparatus 1300 may be configured to perform one or more operations described herein in connection with FIGS. 8-10. In some aspects, the apparatus 1300 and/or one or more components shown in FIG. 13 may include one or more components of the base station described above in connection with FIG. 2. Additionally, or alternatively, one or more components shown in FIG. 13 may be implemented within one or more components described above in connection with FIG. 2. Additionally or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1302 may receive communications, such as reference signals, control information, data communications, or a combination thereof, from the apparatus 1306. The reception component 1302 may provide received communications to one or more other components of the apparatus 1300. In some aspects, the reception component 1302 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1306. In some aspects, the reception component 1302 may include one or more antennas, a demodulator, a MIMO detector, a receive processor, a controller/processor, a memory, or a combination thereof, of the base station described above in connection with FIG. 2.

The transmission component 1304 may transmit communications, such as reference signals, control information, data communications, or a combination thereof, to the apparatus 1306. In some aspects, one or more other components of the apparatus 1306 may generate communications and may provide the generated communications to the transmission component 1304 for transmission to the apparatus 1306. In some aspects, the transmission component 1304 may perform signal processing on the generated communications (such as filtering, amplification, modulation, digital-to-analog conversion, multiplexing, interleaving, mapping, or encoding, among other examples), and may transmit the processed signals to the apparatus 1306. In some aspects, the transmission component 1304 may include one or more antennas, a modulator, a transmit MIMO processor, a transmit processor, a controller/processor, a memory, or a combination thereof, of the base station described above in connection with FIG. 2. In some aspects, the transmission component 1304 may be collocated with the reception component 1302 in a transceiver.

The reception component 1302 may receive a measurement report that includes a modified channel condition value. The beam selection component 1308 may select a beam and/or perform a beam management procedure based at least in part on the measurement report that includes the modified channel condition value. The transmission component 1304 may transmit an indication to the apparatus 1306 regarding the selected beam, such as to add a cell to an SCG, to create an SCG, and/or the like.

The number and arrangement of components shown in FIG. 13 are provided as an example. In practice, there may be additional components, fewer components, different components, or differently arranged components than those shown in FIG. 13. Furthermore, two or more components shown in FIG. 13 may be implemented within a single component, or a single component shown in FIG. 13 may be implemented as multiple, distributed components. Additionally or alternatively, a set of (one or more) components shown in FIG. 13 may perform one or more functions described as being performed by another set of components shown in FIG. 13.

The following provides an overview of some Aspects of the present disclosure:

Aspect 1: A method of wireless communication performed by a user equipment (UE), comprising: performing a cell search using a first set of beams; determining a channel condition value based at least in part on performing the cell search; modifying the channel condition value based at least in part on at least one of: the first set of beams used to perform the cell search, a beam selected from the first set of beams, or a second set of beams that is different from the first set of beams and that is included in a beamforming codebook associated with the UE; and transmitting a measurement report that includes the modified channel condition value.

Aspect 2: The method of Aspect 1, wherein the second set of beams is not used to perform the cell search.

Aspect 3: The method of any of Aspects 1-2, wherein the cell search is performed in association with adding a cell for dual connectivity.

Aspect 4: The method of any of Aspects 1-3, wherein the channel condition value is modified based at least in part on at least two of: the first set of beams, the selected beam, or the second set of beams.

Aspect 5: The method of any of Aspects 1-4, wherein the channel condition value is modified based at least in part on the first set of beams, the selected beam, and the second set of beams.

Aspect 6: The method of any of Aspects 1-5, wherein the selected beam is a strongest beam measured in the first set of beams based at least in part on performing the cell search.

Aspect 7: The method of any of Aspects 1-6, wherein the second set of beams have a spatial relationship with the selected beam.

Aspect 8: The method of Aspect 7, wherein the channel condition value is modified further based at least in part on one or more gain parameters calculated for the second set of beams.

Aspect 9: The method of Aspect 8, wherein each of the one or more gain parameters corresponds to a maximum gain associated with the second set of beams in a respective direction.

Aspect 10: The method of any of Aspects 1-9, wherein the channel condition value is modified further based at least in part on a third set of beams that have a spatial relationship with the selected beam.

Aspect 11: The method of Aspect 10, wherein the channel condition value is modified further based at least in part on one or more gain parameters calculated for the third set of beams.

Aspect 12: The method of Aspect 11, wherein each of the one or more gain parameters corresponds to a maximum gain associated with the third set of beams in a respective direction.

Aspect 13: The method of any of Aspects 1-12, wherein modifying the channel condition value further comprises: identifying a first gain matrix for a third set of beams that is associated with a same antenna array as the selected beam and uses a same number of antenna elements as the first set of beams; identifying a second gain matrix for the second set of beams, wherein the second set of beams is associated with a same antenna array as the selected beam and uses more antenna elements than the first set of beams; calculating a potential gain matrix as a difference between the first gain matrix and the second gain matrix; calculating a nominal gain based at least in part on the potential gain matrix; and combining the nominal gain and the channel condition value to form the modified channel condition value.

Aspect 14: The method of any of Aspects 1-13, wherein the first set of beams use a single antenna element, and the second set of beams use multiple antenna elements.

Aspect 15: The method of any of Aspects 1-14, wherein the channel condition value is modified further based at least in part on at least one of: a thermal mitigation factor, a geographic location of the UE, an estimated angle of a signal received by the UE or transmitted by the UE, a throughput requirement associated with the UE, a remaining battery charge of the UE, or a battery charging status of the UE.

Aspect 16: An apparatus for wireless communication at a device, comprising a processor; memory coupled with the processor; and instructions stored in the memory and executable by the processor to cause the apparatus to perform the method of one or more of Aspects 1-15.

Aspect 17: A device for wireless communication, comprising a memory and one or more processors coupled to the memory, the one or more processors configured to perform the method of one or more of Aspects 1-15.

Aspect 18: An apparatus for wireless communication, comprising at least one means for performing the method of one or more of Aspects 1-15.

Aspect 19: A non-transitory computer-readable medium storing code for wireless communication, the code comprising instructions executable by a processor to perform the method of one or more of Aspects 1-15.

Aspect 20: A non-transitory computer-readable medium storing a set of instructions for wireless communication, the set of instructions comprising one or more instructions that, when executed by one or more processors of a device, cause the device to perform the method of one or more of Aspects 1-15.

The foregoing disclosure provides illustration and description, but is not intended to be exhaustive or to limit the aspects to the precise form disclosed. Modifications and variations may be made in light of the above disclosure or may be acquired from practice of the aspects.

As used herein, the term "component" is intended to be broadly construed as hardware, firmware, and/or a combination of hardware and software. As used herein, a processor is implemented in hardware, firmware, and/or a combination of hardware and software. It will be apparent that systems and/or methods described herein may be implemented in different forms of hardware, firmware, and/or a combination of hardware and software. The actual specialized control hardware or software code used to implement these systems and/or methods is not limiting of the aspects. Thus, the operation and behavior of the systems and/or methods were described herein without reference to specific software code—it being understood that software and hardware can be designed to implement the systems and/or methods based, at least in part, on the description herein.

As used herein, satisfying a threshold may, depending on the context, refer to a value being greater than the threshold, greater than or equal to the threshold, less than the threshold, less than or equal to the threshold, equal to the threshold, not equal to the threshold, and/or the like.

Even though particular combinations of features are recited in the claims and/or disclosed in the specification, these combinations are not intended to limit the disclosure of various aspects. In fact, many of these features may be combined in ways not specifically recited in the claims and/or disclosed in the specification. Although each dependent claim listed below may directly depend on only one claim, the disclosure of various aspects includes each dependent claim in combination with every other claim in the claim set. A phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items (e.g., related items, unrelated items, a combination of related and unrelated items, and/or the like), and may be used interchangeably with "one or more." Where only one item is intended, the phrase "only one" or similar language is used. Also, as used herein, the terms "has," "have," "having," and/or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A method of wireless communication performed by a user equipment (UE), comprising:
    performing a cell search using a first set of beams; and
    transmitting a measurement report that includes a modified channel condition value, the modified channel condition value being based at least in part on:
        a channel condition value that is based at least in part on the performance of the cell search;
        a beam selected from the first set of beams;
        a second set of beams that are associated with a same antenna array as the selected beam, wherein the second set of beams are included in a beamforming codebook associated with the UE, and wherein the second set of beams use more antenna elements than the first set of beams; and
        a third set of beams that are associated with the same antenna array as the selected beam and use a same number of antenna elements as the first set of beams.

2. The method of claim 1, wherein the second set of beams are not used to perform the cell search.

3. The method of claim 1, wherein the cell search is performed in association with adding a cell for dual connectivity.

4. The method of claim 1, wherein the selected beam is a strongest beam measured in the first set of beams based at least in part on performing the cell search.

5. The method of claim 1, wherein the second set of beams have a spatial relationship with the selected beam.

6. The method of claim 5, wherein the modified channel condition value is further based at least in part on one or more gain parameters calculated for the second set of beams.

7. The method of claim 6, wherein each of the one or more gain parameters corresponds to a maximum gain associated with the second set of beams in a respective direction.

8. The method of claim 1, wherein the third set of beams have a spatial relationship with the selected beam.

9. The method of claim 8, wherein the modified channel condition value is further based at least in part on one or more gain parameters calculated for the third set of beams.

10. The method of claim 9, wherein each of the one or more gain parameters corresponds to a maximum gain associated with the third set of beams in a respective direction.

11. The method of claim 1, wherein modifying the channel condition value comprises:
    identifying a first gain matrix for the third set of beams;
    identifying a second gain matrix for the second set of beams;
    calculating a potential gain matrix as a difference between the first gain matrix and the second gain matrix;

calculating a nominal gain based at least in part on the potential gain matrix; and combining the nominal gain and the channel condition value to form the modified channel condition value.

12. The method of claim 1, wherein the first set of beams use a single antenna element, and the second set of beams use multiple antenna elements.

13. The method of claim 1, wherein the modified channel condition value is further based at least in part on at least one of:
a thermal mitigation factor,
a geographic location of the UE,
an estimated angle of a signal received by the UE or transmitted by the UE,
a throughput requirement associated with the UE,
a remaining battery charge of the UE, or
a battery charging status of the UE.

14. A user equipment (UE) for wireless communication, comprising:
one or more memories; and
one or more processors coupled to the one or more memories, the one or more processors configured to:
perform a cell search using a first set of beams; and
transmit a measurement report that includes a modified channel condition value, the modified channel condition value being based at least in part on:
a channel condition value that is based at least in part on the performance of the cell search;
a beam selected from the first set of beams;
a second set of beams that are associated with a same antenna array as the selected beam, wherein the second set of beams are included in a beamforming codebook associated with the UE, and wherein the second set of beams use more antenna elements than the first set of beams; and
a third set of beams that are associated with the same antenna array as the selected beam and use a same number of antenna elements as the first set of beams.

15. The UE of claim 14, wherein the second set of beams are not used to perform the cell search.

16. The UE of claim 14, wherein the cell search is performed in association with adding a cell for dual connectivity.

17. The UE of claim 14, wherein the selected beam is a strongest beam measured in the first set of beams based at least in part on performing the cell search.

18. The UE of claim 14, wherein the second set of beams have a spatial relationship with the selected beam.

19. The UE of claim 18, wherein the modified channel condition value is further based at least in part on one or more gain parameters calculated for the second set of beams.

20. The UE of claim 19, wherein each of the one or more gain parameters corresponds to a maximum gain associated with the second set of beams in a respective direction.

21. The UE of claim 14, wherein the third set of beams have a spatial relationship with the selected beam.

22. The UE of claim 21, wherein the modified channel condition value is further based at least in part on one or more gain parameters calculated for the third set of beams.

23. The UE of claim 22, wherein each of the one or more gain parameters corresponds to a maximum gain associated with the third set of beams in a respective direction.

24. The UE of claim 14, wherein the one or more processors, to modify the channel condition value, are configured to:
identify a first gain matrix for the third set of beams;

identify a second gain matrix for the second set of beams;
calculate a potential gain matrix as a difference between the first gain matrix and the second gain matrix;
calculate a nominal gain based at least in part on the potential gain matrix; and
combine the nominal gain and the channel condition value to form the modified channel condition value.

25. The UE of claim 14, wherein the first set of beams use a single antenna element, and the second set of beams use multiple antenna elements.

26. The UE of claim 14, wherein the modified channel condition value is further based at least in part on at least one of:
a thermal mitigation factor,
a geographic location of the UE,
an estimated angle of a signal received by the UE or transmitted by the UE,
a throughput requirement associated with the UE,
a remaining battery charge of the UE, or
a battery charging status of the UE.

27. A non-transitory computer-readable medium storing a set of instructions for wireless communication, the set of instructions comprising:
one or more instructions that, when executed by one or more processors of a user equipment (UE), cause the UE to:
perform a cell search using a first set of beams; and
transmit a measurement report that includes a modified channel condition value, the modified channel condition value being based at least in part on:
a channel condition value that is based at least in part on the performance of the cell search;
a beam selected from the first set of beams;
a second set of beams that are associated with a same antenna array as the selected beam, wherein the second set of beams are included in a beamforming codebook associated with the UE, and wherein the second set of beams use more antenna elements than the first set of beams; and
a third set of beams that are associated with the same antenna array as the selected beam and use a same number of antenna elements as the first set of beams.

28. The non-transitory computer-readable medium of claim 27, wherein the third set of beams have a spatial relationship with the selected beam.

29. An apparatus for wireless communication, comprising:
means for performing a cell search using a first set of beams; and
means for transmitting a measurement report that includes a modified channel condition value, the modified channel condition value being based at least in part on:
a channel condition value that is based at least in part on the performance of the cell search;
a beam selected from the first set of beams;
a second set of beams that are associated with a same antenna array as the selected beam, wherein the second set of beams are included in a beamforming codebook associated with the apparatus, and wherein the second set of beams use more antenna elements than the first set of beams; and
a third set of beams that are associated with the same antenna array as the selected beam and use a same number of antenna elements as the first set of beams.

30. The apparatus of claim 29, wherein the third set of beams have a spatial relationship with the selected beam.

\* \* \* \* \*